(12) United States Patent
Nguyen et al.

(10) Patent No.: US 8,782,284 B2
(45) Date of Patent: Jul. 15, 2014

(54) EXTENSIBLE DEPLOYMENT SYSTEM

(71) Applicant: CareFusion 303, Inc., San Diego, CA (US)

(72) Inventors: Nick T. Nguyen, San Marcos, CA (US); Richard W. Massey, Carlsbad, CA (US); Willis Lam, San Diego, CA (US); Ryan Nguyen, San Diego, CA (US); Gerald E. Barnefiher, Harleysville, PA (US)

(73) Assignee: CareFusion 303, Inc., San Diego, CA (US)

( * ) Notice: Subject to any disclaimer, the term of this patent is extended or adjusted under 35 U.S.C. 154(b) by 0 days.

(21) Appl. No.: 13/678,472

(22) Filed: Nov. 15, 2012

(65) Prior Publication Data

US 2014/0137222 A1 May 15, 2014

(51) Int. Cl.
*G06F 15/16* (2006.01)
(52) U.S. Cl.
USPC ................................................ 709/246
(58) Field of Classification Search
None
See application file for complete search history.

(56) References Cited

U.S. PATENT DOCUMENTS

| | | | |
|---|---|---|---|
| 6,256,676 B1 * | 7/2001 | Taylor et al. | 709/246 |
| 6,574,655 B1 * | 6/2003 | Libert et al. | 709/200 |
| 8,214,329 B2 * | 7/2012 | Gilder et al. | 707/622 |
| 8,458,300 B2 * | 6/2013 | Rive et al. | 709/220 |
| 8,560,568 B2 * | 10/2013 | Gilder et al. | 707/770 |
| 2003/0177481 A1 * | 9/2003 | Amaru et al. | 717/148 |
| 2006/0235899 A1 * | 10/2006 | Tucker | 707/200 |
| 2009/0094350 A1 * | 4/2009 | Rive et al. | 709/220 |
| 2010/0228559 A1 * | 9/2010 | Boone | 705/1.1 |
| 2010/0257374 A1 * | 10/2010 | Kuehn et al. | 713/189 |
| 2012/0185725 A1 * | 7/2012 | Peters et al. | 714/6.2 |
| 2012/0239824 A1 | 9/2012 | Nguyen et al. | |
| 2013/0297477 A1 * | 11/2013 | Overman et al. | 705/37 |

* cited by examiner

*Primary Examiner* — Jeffery Williams
(74) *Attorney, Agent, or Firm* — McDermott Will & Emery LLP

(57) ABSTRACT

An extensible deployment system is disclosed that provides for flexible deployment and centralized management of a scalable communication system. The scalable communication system may be segmented into multiple groups of services, e.g. multiple solutions, that may be deployed across one or more servers. The groups of services may each access separate databases in a single database instance that may allow for the groups of services to be deployed and upgraded independently. A management interface may be provided that allows for centralized management, and deployment, of all of the groups of services, irrespective of the independent upgrade paths of the groups of services. The management interface may include a local authentication system and may also be interoperable with one or more external authentication systems, such that users may use login credentials of an external authentication system to access the management interface.

22 Claims, 23 Drawing Sheets

EXTENSIBLE DEPLOYMENT SYSTEM

TECHNICAL FIELD

The present description relates generally to a deployment system, and more particularly, but not exclusively, to an extensible deployment system.

BACKGROUND

Hospitals and other caregiving institutions typically employ a number of different electronic device and data systems to carry out many of the functions of the hospital. These different data systems often utilize incompatible signaling and communication protocols for the various types of systems, which can include Admit-Discharge-Transfer (ADT), physician order entry (POE), electronic Medicine Administration Record (eMAR), and others. Certain data systems, for example a medication management system such as the Pyxis MedStation™ system, receive information from one or more of these other systems on a continuous basis. As each data system may use a different message protocol or data structure, messages cannot be sent directly from one data system to another without customizing one or both data systems. Further, different manufacturers will also use different protocols, making control and communication between data systems very difficult. The maintenance and updating of multiple customized data systems to communicate within a complicated interconnected network of data systems within a hospital is a complex and sizeable task.

In some instances, a hospital environment may include one or more messaging conversion systems to facilitate communication between the different data systems across multiple sites. However, deploying, upgrading, or extending the messaging conversion systems can become extremely difficult to perform and even harder to validate, which may lead to a reduction in service or reliability of the data exchange for the large hospital systems that depend the most upon this type of integration to provide quality care to their patients.

SUMMARY

The disclosed subject matter relates to a method for extensible deployment of a scalable communication system. The method may include receiving a first request to create a first service grouping for services that will share a first database, wherein the first request comprises a first identifier of a first server. The method may further include retrieving first scripts for creating the first database from a first agent executing on the first server. The method may further include generating, by a processor, the first database based on the first scripts, and receiving a second request to add a first service to the first service grouping, wherein the second request comprises the first identifier of the first server. The method may further include transmitting, to the first agent executing on the first server, a first command to create the first service on the first server and providing a first indication that the first service was added to the first service grouping.

The disclosed subject matter also relates to an extensible deployment system. The system may include one or more processors and a memory including instructions that, when executed by the one or more processors, cause the one or more processors to: receive a user authentication request for accessing a management interface, wherein the user authentication request comprises a user identifier and a password, determine whether the user identifier exists in a local user database, authenticate the user identifier and the password through a local authentication system if the user identifier exists in the local user database, otherwise authenticate the user identifier and password through an external authentication system, and provide the management interface if the user identifier and the password are authenticated through either the local authentication system or the external authentication system, otherwise deny access to the management interface.

The disclosed subject matter also relates to a machine-readable medium embodying instructions that, when executed by a machine, allow the machine to perform a method for extensible deployment of a scalable communication system. The method may include generating a management database in a database instance for supporting a plurality of groups of services and retrieving a first set of scripts from a first server and a second set of scripts from a second server. The method may further include generating a first database in the database instance for a first group of services of the plurality of groups of services using the first set of scripts and a second database in the database instance for a second group of services of the plurality of groups of services using the second set of scripts, wherein the first database comprises a different schema than the second database. The method may further include transmitting a first command to a first agent process executing on the first server to initiate a first service of the first group of services, wherein the first service accesses the first database to translate a first plurality of messages that are received from a first plurality of devices. The method may further include transmitting a second command to a second agent process executing on the second server to initiate a second service of the second group of services, wherein the second service accesses the second database to translate a second plurality of messages that are received from a second plurality of devices, and providing a user interface for managing the first service and the second service.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the clauses listed below. However, for purpose of explanation, several embodiments of the subject technology are set forth in the following figures.

FIG. 15 illustrates an example user interface for message tracing in a deployed centralized communication system in accordance with one or more implementations.

FIG. 18 illustrates an example user interface for searching message tracing in a grid format in a deployed centralized communication system in accordance with one or more implementations.

FIG. 19 illustrates an example user interface for searching message tracing in a health level 7 (HL7) format in a deployed centralized communication system in accordance with one or more implementations.

DETAILED DESCRIPTION

Figure 1:
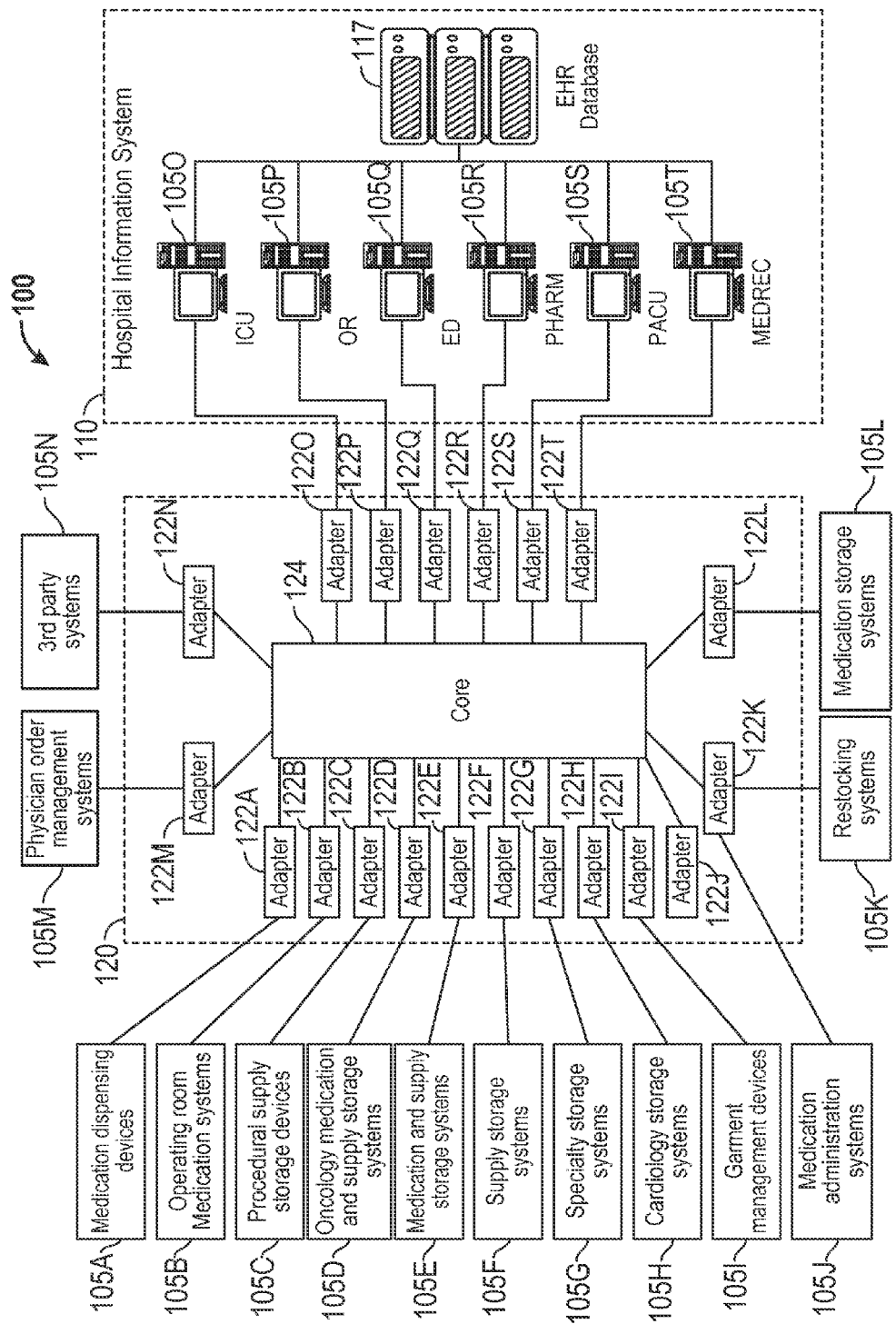
FIG. 1 illustrates an example hospital system in which a centralized communication system may be deployed in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In some instances, well-known structures and components are shown in block diagram form in order to avoid obscuring the concepts of the subject technology.

Interoperability has become complex and challenging within the healthcare environment as many hospitals typically employ many different applications and devices developed by many different vendors on an everyday basis. A centralized communication system that includes integration solutions that allow data or information exchanged between the systems at both the vendor's and the user's ends, and allow all systems working together seamlessly is desired. The vendor's end may include, for example, a hospital information system (HIS) such as any, or any combination of, an admission, discharge and transfer (ADT) system, a patient order data system, a formulary data system, an operating room information system (ORIS), an electronic medical record (EMR) system, an MMIS, a billing system, and/or a packaging system. The user's end may include various application or patient devices such as a dispensing device, an infusing device, and a ventilator operated by a nurse, a caregiver, or even the patient himself or herself.

In a given hospital system, the integration solutions for the different systems and devices may be managed separately. For example, an integration solution for the HIS system may be managed by a separate group than the integration solution for the patient devices. Furthermore, the individual groups may have different budgetary or system/resource constraints that may impact how the individual groups deploy and/or upgrade the individual integration solutions. Thus, it may be desirable to allow for independent deployment of the integration solutions, such that, e.g., an individual integration solution in a hospital system may be deployed across any number of servers, independent of the deployment of the other integration solutions in the hospital system, while maintaining interoperability with the other integration solutions in the hospital. Similarly, it may be desirable to allow for independent upgrades to the integration solutions such that an individual integration solution in a hospital system may be upgraded independent of the other integration solutions in the hospital system, while maintaining interoperability with the other integration solutions in the hospital system. It may also be desirable to provide a centralized management interface that provides for centralized management and monitoring of all of the integration solutions in a hospital system, irrespective of the deployment and/or upgrade path of the individual integration solutions.

FIG. 1 illustrates an example system architecture for a centralized communication system (CCS) 120 deployed within a hospital system 100 in accordance with one or more implementations. Not all of the depicted components may be required, however, and one or more implementations may include additional components not shown in the figure. Variations in the arrangement and type of the components may be made without departing from the spirit or scope of the clauses as set forth herein. Additional, different or fewer components may be provided. Furthermore, for explanatory purposes the CCS 120 is described as being deployed in a hospital system 100. However, the CCS 120 is not limited to being deployed in a hospital system 100, but may be deployed in any network environment that may implement an intercommunication system.

The hospital system 100 includes medical devices and data systems 105A-N, a hospital information system 110, and the CCS 120. In one example the hospital system 100 may be, or may be part of, an integrated delivery network (IDN). The hospital information system 110 may include a number of separate electronic health record (EHR) systems 105O-T, including an intensive care unit (ICU) system 105O, an operating room (OR) system 105P, an emergency department (ED) system 105Q, a pharmacy (PHARM) system 105R, a post-anesthesia care unit (PACU) system 105S, and a medical records (MEDREC) system 105T. Any of the EHR systems 105O-T may be networked to an EHR database 117.

The medical devices and data systems 105A-N may include one or more medication dispensing devices 105A, such as Pyxis MedStation™ Automated Dispensing Machines (ADMs), that may store and dispense medications at a nurse's station, one or more operating room medication systems 105B, such as Pyxis® Anesthesia Systems, that may store and manage the medications used by anesthesiologists in the operating room, one or more procedural supply storage devices 105C, such as Pyxis SpecialtyStations™, that may store medications and supplies in individual treatment areas, one or more oncology medication and supply storage systems 105D, such as Pyxis OncologyStations™, that may manage the specialized and hazardous medications used to treat cancer in an oncology department, one or more medication and supply storage systems 105E, such as Pyxis DuoStations, that may be used in areas that require storage of both medications and supplies, one or more supply storage systems 105F, such as Pyxis Supply Station systems, that may be used to store supplies at points of care around a hospital, one or more specialty storage systems 105G, such as Pyxis Procedure Station systems, that may provide storage for equipment and supplies used in specialized areas, such as perioperative environments and procedural suites.

The medical devices and data systems 105A-N may further include one or more cardiology storage systems 105H, such as Pyxis CatRacks, that may store supplies used in cardiac units and radiology labs, including such items as pacemakers, stents, and catheters, one or more garment management devices 105I, such as Pyxis ScrubStations® systems, that may dispense and/or collect scrubs worn by doctors and nurses, one or more medication administration systems 105J, such as Pyxis Patient Point of Care (PPOC) verification systems, that may manage the administration of medications, one or more restocking systems 105K, such as a Pyxis PARx® system, that may be used in a hospital pharmacy to gather medications to replenish the distributed dispensing devices within the hospital, one or more medication storage systems 105L, such as a Pyxis CII Safe™ system, that may store controlled substances within the hospital, one or more physician order management systems 105M, such as a Pyxis Connect system, that may capture medication orders from physicians and transfers them to a pharmacy where a pharmacist reviews the orders and releases them in the medication management system, and one or more third party systems 105N, such as a PHACTS® system, that may manage medications within the pharmacy and pharmacy-managed devices.

The CCS 120 may include a core 124 and one or more adapters 122A-T, such as interface modules, for one or more of the medical devices or data systems 105A-T that are part of the hospital system 100. The core 124 may represent one or more integration solutions, where each integration solution includes a group of CCS services that share queues and a database. The CCS 120 may reside on a single server, or multiple servers, such as collocated servers and/or disparately located servers. In the instance of multiple servers, the adapters 122A-T may be spread across the servers and each server may include one of the CCS services of the core 124. An exemplary configuration of a CCS 120 is discussed further below with respect to FIG. 2.

Any of the adapters 122A-T, such as the adapter 122A, may be built from a common basic structure, or "framework", and may be customized according to the particular native message format used by the medical device or data system 105A-T that will be connected to the adapter 122A, such as a medication dispensing device 105A. The core 124 may transfer messages in an internal messaging format between the adapters 122A-T. In one or more implementations, the internal messaging format may be different than the native message formats used by one or more of the medical devices and data systems 105A-T. The internal messaging format is common to all internal messaging format messages regardless of which of the adapters 122A-T is providing the internal messaging format message or which of the adapters 122A-T is receiving the internal messaging format message.

The adapters 122A-T may each be associated with one or more queues in a database that may provide for persistent storage of the internal messaging format messages that are received and/or transferred by the adapters 122A-T. Thus, any message that is transferred through the CCS 120 may be stored in a queue before being routed to its destination. For example, when a message arrives at a particular adapter 122A, such as from a medication dispensing device 105A, the message is stored in a queue associated with the adapter 122A. The adapter 122A may process the messages in its queue on a first-in-first-out basis, or on any other basis. Thus, when the adapter 122A retrieves a message from its queue, the adapter 122A determines the destination of the message, and transfers the message to the appropriate adapter, such as the adapter 122J. However, the message remains in the queue of the adapter 122A until the adapter 122A receives an indication from the medication dispensing device 105A that the message has been received by the medication administration system 105J.

In one or more implementations, the message queues may represent three check points that, in a default configuration, are part of a message life-cycle. The three checkpoints may be an In-Queue (InQ), the Standard-Out-Queue (StdOutQ), and the Out-Queue (OutQ). If the CCS 120 shuts down at any time, the processing of the messages will re-start at the previous checkpoint of each message due to the use of the queues. In addition, any message that is transferred through the CCS 120 may be traced based on the location of the message in any of the queues, or based on any additional checkpoints in the CCS 120. For example, a logging component of the CCS 120 may insert log messages into a database of the CCS 120 depending on the type of log messages, e.g. different types of events in the CCS 120. A log entry in the database may include an indication of a date/time of an event, such as a timestamp, a category, a log message, and a log owner.

The CCS 120 may provide a user interface that includes a log viewer for viewing logs. The log viewer may allow a user to trace all related messages from any one message in a group. If a message was dropped, the message may include an indicator of where the message was dropped and failed to complete its life-cycle, e.g. the message life cycle may start when a message enters the CCS 120 and may complete when the message leaves the CCS 120. The log viewer may allow the messages to be parsed based on one or more formats, such as Pyxis messages, Health Level 7 (HL7) messages, etc. The log viewer may also indicate business rules that may have caused a message to be dropped. The log viewer may allow a user to perform message trace searches at the solution level, the service level, and/or across the entire IDN. In one or more implementations, the log viewer may be web application and may include one or more of the user interfaces discussed below with respect to FIGS. 15-21.

In one or more implementations, the core 124 transfers internal messaging format messages from a first adapter 122A to one or more second adapters 122B-T according to information provided by the first adapter 122A, thereby functioning in a "push" communication mode. In one or more implementations, the core 124 functions only to transfer internal messaging format messages between adapters 122A-T and does not process the internal messaging format messages. In one or more implementations, a CCS 120 may include one or more adapters 122A-T that may be connected to external devices at multiple physical sites. In the one or more implementations where the core 124 includes multiple CCS services that are associated with different adapters 122A-T, the CCS services may transfer internal messaging format messages between one another, e.g. from an adapter 122A of one CCS service to an adapter 122B of another CCS service.

The CCS 120 creates a layer of abstraction between the medical devices and data systems 105A-T, such that any sending medical device or data system 105A-T or destination medical device or data system 105A-T does not have to know the details of the medical other devices and data systems 105A-T in the hospital system 100 or the IDN, but only needs to know the data and protocols with which it is normally configured to operate. For example, an automated dispensing machine (ADM) may contain data related to inventory but the infusion system may only care about the inventory information of the drugs that are infusing through an infusion pump in an infusion system. As another example, the Point of Care (POC) system may only be configured to be concerned about alerts of a medication override but nothing else from a dispensing system.

Figure 2:
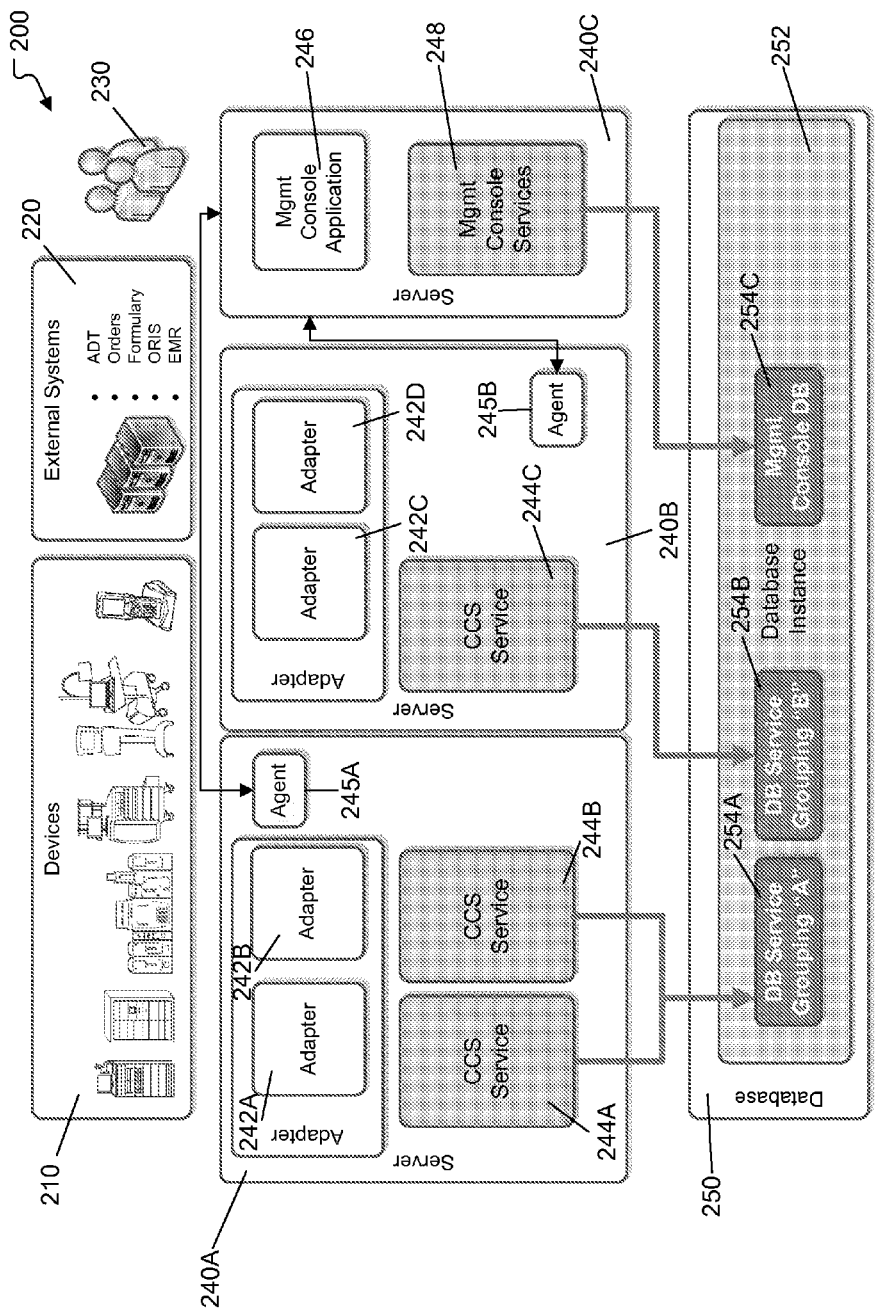
FIG. 2 illustrates an example extensible deployment of a centralized communication system in a hospital system in accordance with one or more implementations.

FIG. 2 illustrates an example extensible deployment 200 of a centralized communication system in a hospital system in accordance with one or more implementations. Not all of the depicted components may be required, however, and one or more implementations may include additional components not shown in the figure. Variations in the arrangement and type of the components may be made without departing from the spirit or scope of the clauses as set forth herein. Additional, different or fewer components may be provided.

The example extensible deployment 200 may include one or more medical devices 210, one or more data systems 220, one or more users 230, one or more servers 240A-C, and one or more database servers 250. The one or more medical devices 210 may include any of the aforementioned medical devices that may be used in a hospital system, such as pumps, infusion systems, etc. The one or more data systems 220 may be any of the aforementioned data systems that may communicate with the medical devices of the hospital system, such as an ADT system, an EMR system, etc. The one or more users 230 may be users who manage the integration solutions for one or more of the medical devices 210 and/or the data systems 220, users who deploy the integration solutions, or generally any administrative or management user.

The servers 240A-C and the database server 250 may represent one or more computing devices that include a memory and one or more processors, such as the computing device discussed below with respect to FIG. 23. The servers 240A-B may host one or more adapters 242A-D, and one or more services 244A-C. The services 244A-C may each include at least one CCS service that executes on the servers 240A-B. In one or more implementations, the services 244A-C may be hosted on any one of the servers 240A-C. The servers 240A-B may also include agents 245A-B that may be processes executing on the servers 240A-B; the agents 245A-B may be in communication with the server 240C. The server 240C may host a management console application 246, and one or more management console services 248, such as Internet Information Server (IIS) services. In one or more implementations, the management console application 246 may be a web application.

The database server 250 may host at least one database instance 252, such as a SQL instance. The databases 254A-C utilized by the severs 240A-C may all exist in a single database instance 252 on the database server 250. Alternatively, the databases 254A-C may exist across multiple database instances 252 on the database server 250. There may be a separate database 254A-B in the database instance 252 for each integration solution, or service grouping, that is deployed. In one or more implementations, a service grouping may represent an integration solution for a given data system or set of patient devices that includes a group of services that share queues and a database. A service grouping in a hospital system operates independently from other services groupings in the hospital, and a service grouping can be configured, managed, deployed, and upgraded independent of the other service groupings in a hospital system. For example, a given deployment may include a service grouping for a infusion integration solution, a service grouping for a dispensing integration solution, etc.

For example, in FIG. 2 the services 244A-B may be part of a service grouping that accesses the database 254A, and the service 244C may be part of a service grouping that access the database 254B. The management console database 254C may store information pertaining to the management console application 246. The services 244A-C may be deployed on the servers 240A-B by the management console application 246, e.g. as discussed below with respect to FIGS. 3 and 4.

Figure 3:
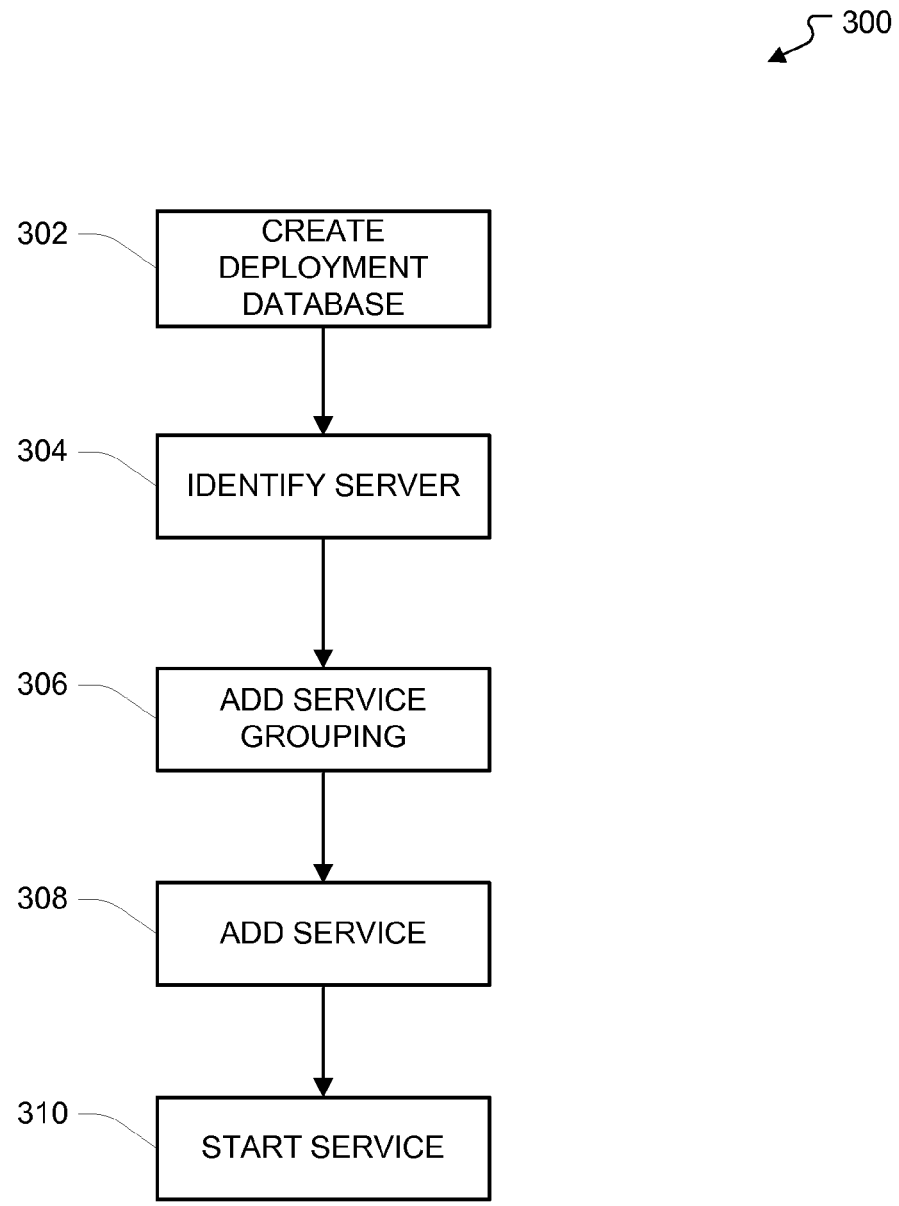
FIG. 3 illustrates a flow diagram of example process for an extensible deployment system in accordance with one or more implementations.

FIG. 3 illustrates a flow diagram of example process 300 for an extensible deployment system in accordance with one or more implementations. For explanatory purposes, the blocks of example process 300 are described herein as occurring in serial, or linearly. However, multiple blocks of example process 300 may occur in parallel. In addition, the blocks of example process 300 need not be performed in the order shown and/or one or more of the blocks of example process 300 need not be performed.

In block 302, a user interacting with the management console application 246 may create a deployment database, such as the management console database 254C. For example, a user may create a deployment database by interacting with the user interface discussed below with respect to FIG. 8. In block 304, a user interacting with the management console application 246 may identify a server 240A that will host at least one service 244A, such as by providing a name and a network address of the server 240A. For example, a user may identify a server 240A by interacting with the user interface discussed below with respect to FIG. 9.

In block 306, a user interacting with the management console application 246 may add a service grouping, which may also be referred to as a solution, such as by providing a name of the service grouping and identifying a server 240A that will host at least one service 244A of the service grouping. A service grouping, or solution, may be a group of services, such as services 244A-B, that share queuing and a database, such as database 254A. In one example, a user may add a service grouping by interacting with the user interface discussed below with respect to FIG. 9. The server 240C may generate a database 254A for the service grouping when the service grouping is added, as is discussed further below with respect to FIG. 4.

In block 308, a user interacting with the management console application 246 may add a service 244A to the service grouping created in block 306, such as by providing a name of the service 244A, a type of the service, and an identifier of the server 240A that will host the service 244A. For example, a user may add a service 244A by interacting with the user interface discussed below with respect to FIG. 11. In block 310, a user interacting with the management console application 246 may start the service 244A created in block 308. For example, a user may start a service 244A by interacting with the user interface discussed below with respect to FIG. 12.

A user may repeat one or more of the blocks 304-310 to create another service grouping within the deployment. Alternatively, or in addition, a user may repeat one or more of the blocks 304 and 308-310 to add an additional service to an existing service grouping. In this manner, a user may deploy multiple independent service groupings within an IDN that may be individually managed and upgraded.

Figure 4:
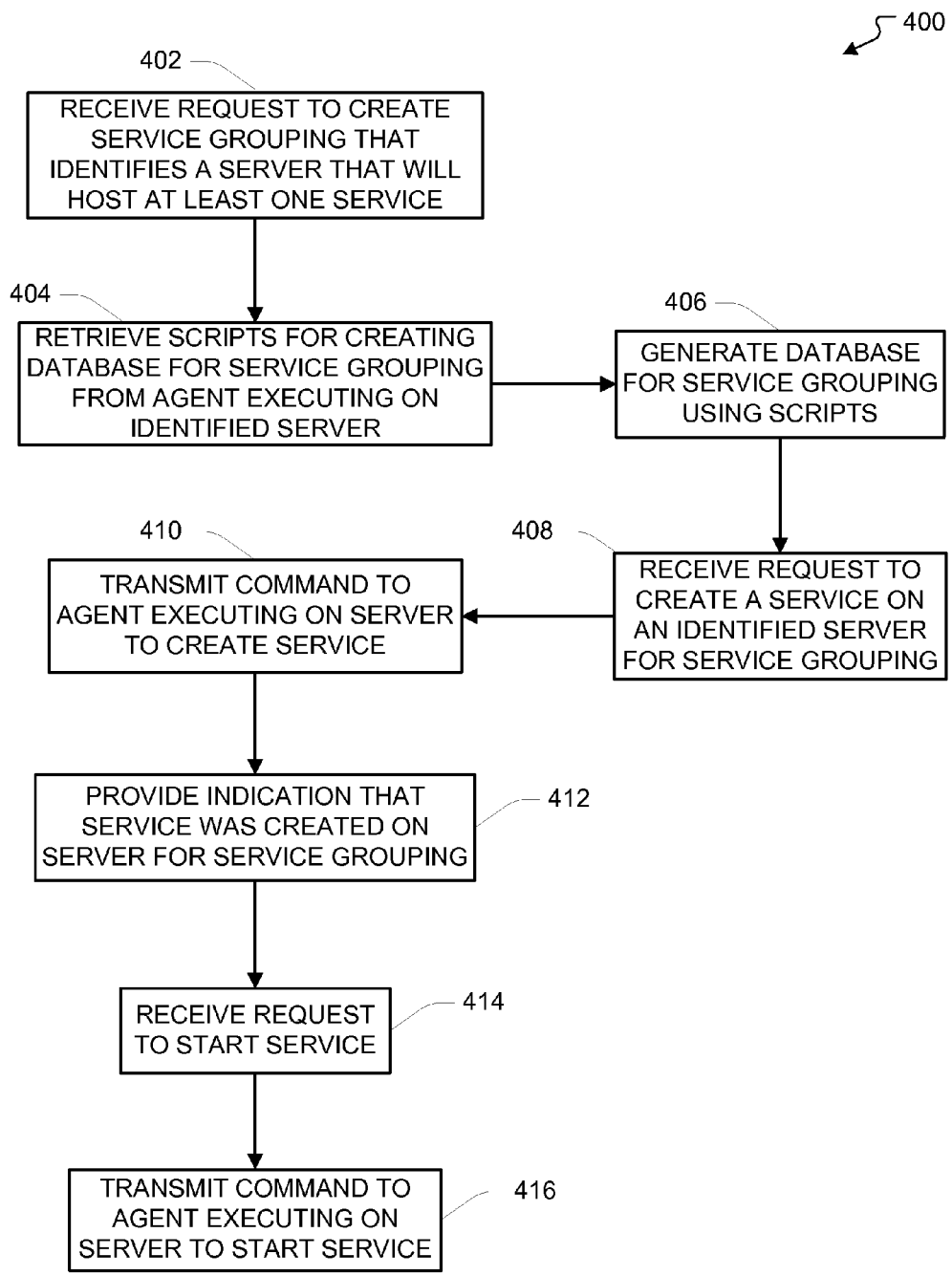
FIG. 4 illustrates a flow diagram of example process for an extensible deployment system in accordance with one or more implementations.

FIG. 4 illustrates a flow diagram of example process 400 for an extensible deployment system in accordance with one or more implementations. For explanatory purposes, the blocks of example process 400 are described herein as occurring in serial, or linearly. However, multiple blocks of example process 400 may occur in parallel. In addition, the blocks of example process 400 need not be performed in the order shown and/or one or more of the blocks of example process 400 need not be performed.

In block 402, a server 240C receives a request to create a service grouping, such as from a user interacting with the management console application 246. The request may include a name of the service grouping and an identifier of a server 240A that will host at least one service 244A of the service grouping. The server 240C may have been previously configured to retrieve and store information in a management console database 254C. In one or more implementations, the server 240C may store the name of the service grouping in the management console database 254C.

In block 404, the server 240C may retrieve scripts for creating a database 254A for the service grouping from an agent 245A that is executing on the server 240A identified in the request. For example, the server 240C may transmit a message to the agent 245A that requests the scripts for creating the database 254A. In one or more implementations, the scripts may be specific to the service grouping identified in block 402, and may be upgraded or changed independent of the scripts used to generate databases for any other service groupings.

In block 406, the server 240C may generate the database 254A for the service grouping within the database instance 252. For example, the server 240C may execute the scripts retrieved in block 404 to generate the database 254A in the database instance 252. The server 240C may set the name of the database 254A to be, or to include at least a portion of, the name of the service grouping. For example, the name of the service grouping may be a prefix or suffix for the name of the database 254A. In one or more implementations, the server 240C may store the name of the database 254A, and an association between the name of the database 254A and the name of the service grouping, in the management console database 254C.

In block 408, the server 240C may receive a request to create a service 244A as part of the service grouping created in block 402, such as from a user interacting with the management console application 246. The request may identify the server 240A on which the service 244A will be deployed. In block 410, the server 240C may transmit a command to the agent 245A executing on the server 240A that instructs the agent 245A to create the service 244A. The agent 245A may create the service 244A, and the agent 245A may configure the service 244A to access the database 254A.

In block 412, the server 240C may provide an indication that the service 244A was created on the server 240A as part of the identified service grouping. For example, the server 240C may provide a user interface to a user interacting with the management console application 246 that indicates that the service 244A was created and/or provides a status of the service. For example, the server 240C may provide the user with the user interface discussed below with respect to FIG. 14.

In block 414, the server 240C may receive a request to start the service 244A. For example, a user interacting with the management console application 246 may transmit a request to start the service 244A to the server 240C. In block 416, the server 240C may transmit a command to the agent 245A that is executing on the server 240A that instructs the agent 245A to start the service 244A.

Figure 5:
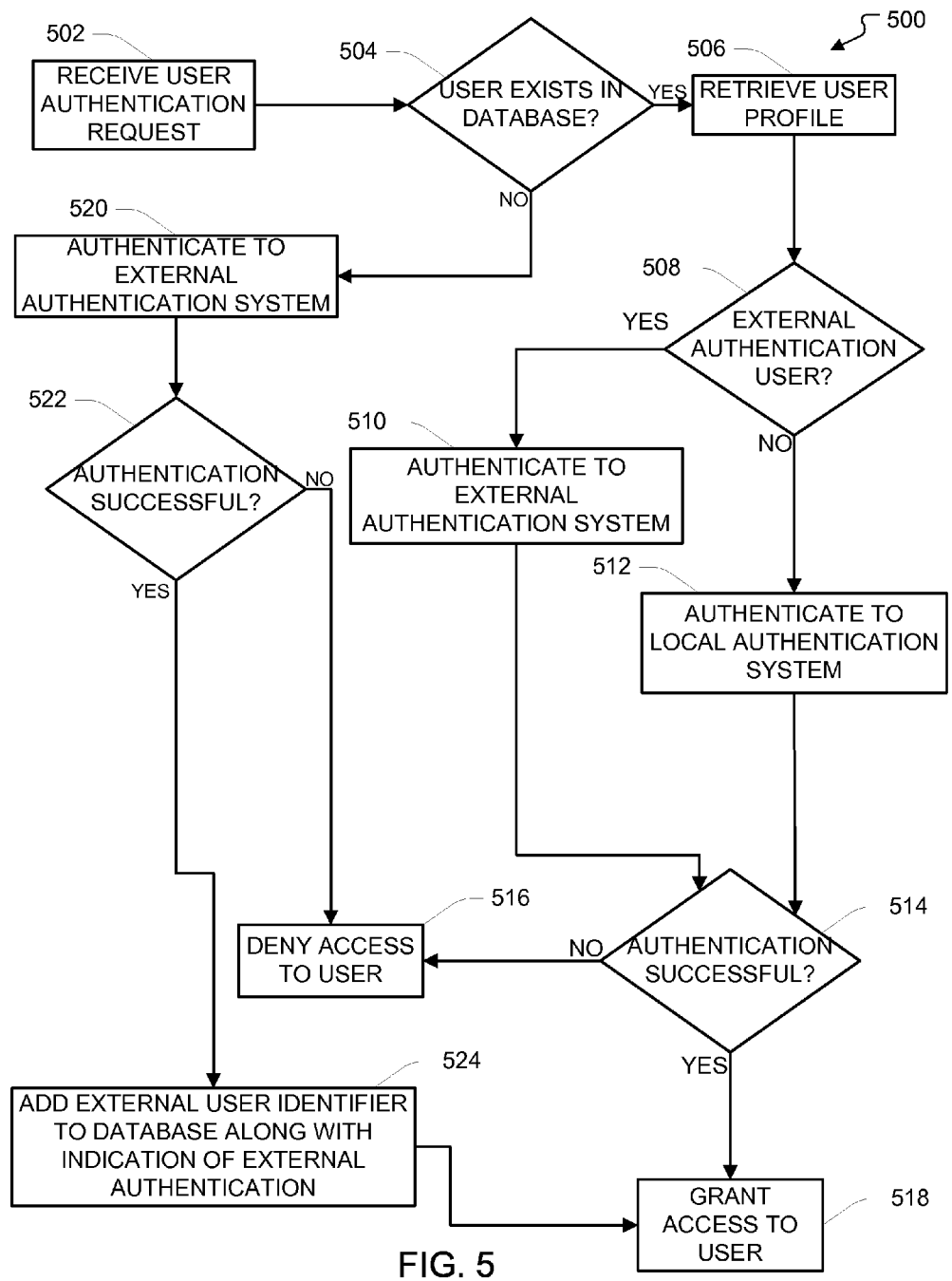
FIG. 5 illustrates a flow diagram of example process for user authentication in an extensible deployment system in accordance with one or more implementations.

FIG. 5 illustrates a flow diagram of example process 500 for user authentication in an extensible deployment system in accordance with one or more implementations. For explanatory purposes, the blocks of example process 500 are described herein as occurring in serial, or linearly. However, multiple blocks of example process 500 may occur in parallel. In addition, the blocks of example process 500 need not be performed in the order shown and/or one or more of the blocks of example process 500 need not be performed.

In block 502, the server 240C may receive a user authentication request, such as a request received from a user attempting to access the management console application 246. In one or more implementations, the user authentication request may include a user identifier and a password. For example, the server 240C may provide a user login interface to a user interacting with the management console application 246. In one or more implementations, the server 240C may self-sign a security certificate and may provide the self-signed certificate to the user interacting with the management console application 246, thereby allowing the login credentials of the user to be transmitted over a secure connection, such as a Secure Sockets Layer (SSL) connection. The self-signed certificate may include, e.g. the name of the server 240C, the network address of the server 240C, or any other identifying information pertaining to the server 240C. In one or more implementations, the self-signed certificate may be dynamically generated at the time that the server 240C is deployed.

In block 504, the server 240C may determine whether the user identifier of the user authentication request exists in a local user database, such as the management console database 254C. If, in block 504, the server 240C determines that the user identifier exists in the local user database, the server 240C moves to block 506. In block 506, the server 240C retrieves user profile information associated with the user identifier from the local user database. In block 508, the server 240C determines whether the user profile information indicates that the user identifier is from an external authentication system, such as an Active Directory system or any other external authentication system. For example, the user profile information may include an indication of whether the user identifier is a local user identifier, e.g. an internal user identifier, or an external user identifier. Alternatively, or in addition, if the server 240C authenticates users through multiple external authentication systems, the user profile information may include an indication of a particular external authentication system when the user identifier is from an external authentication system.

If, in block 508, the server 240C determines that the user identifier is from an external authentication system, e.g. the user identifier is an external user identifier, the server 240C moves to block 510. In block 510, the server 240C authenticates the user identifier though an external authentication system. For example, the server 240C may securely transmit the login credentials of the user, such as the user identifier and a password, to the external authentication system. If, in block 508, the server 240C determines that the user identifier is not from an external authentication system, e.g. the user identifier is an internal user identifier, the server 240C moves to block 512. In block 512, the server 240C authenticates the user through the local user authentication system. For example, the server 240C may verify whether the login credentials of the user, e.g. the user identifier and a password, matches information stored in the local user database.

If, in block 514, the server 240C determines that the authentication of the user was successful, the server 240C moves to block 518. In block 518, the server 240C grants the user access to the management console application 246. For example the server 240C may provide the user with the user interface discussed below with respect to FIG. 13. If, in block 514, the server 240C determines that the authentication was not successful, the server 240C moves to block 516. In block 516, the server 240C denies the user access to the management console application 246.

If, in block 504, the server 240C determines that the user identifier does not exist in the local user database, the server 240C moves to block 520. In block 520, the server 240C authenticates the user identifier through an external authentication system. For example, the server 240C may securely transmit the login credentials of the user, such as the user identifier and a password, to an external authentication system. If the server 240C authenticates users through multiple external authentication systems, the server 240C may attempt to authenticate the login credentials of the user with each of the external authentication systems.

If, in block 522, the server 240C determines that the authentication of the user was successful, the server 240C moves to block 524. In block 524, the server 240C adds the external user identifier to the local user database along with an indication that the user identifier should be authenticated through an external authentication system. If the server 240C authenticates users through multiple external authentication systems, the server 240C may also store an indication of the particular external authentication system through which the user is authenticated. In block 524, the server 240C grants the user access to the management console application 246. For example the server 240C may provide the user with the user interface discussed below with respect to FIG. 13. If, in block 522, the server 240C determines that the authentication was not successful, the server 240C moves to block 516. In block 516, the server 240C denies the user access to the management console application 246.

Figure 6:
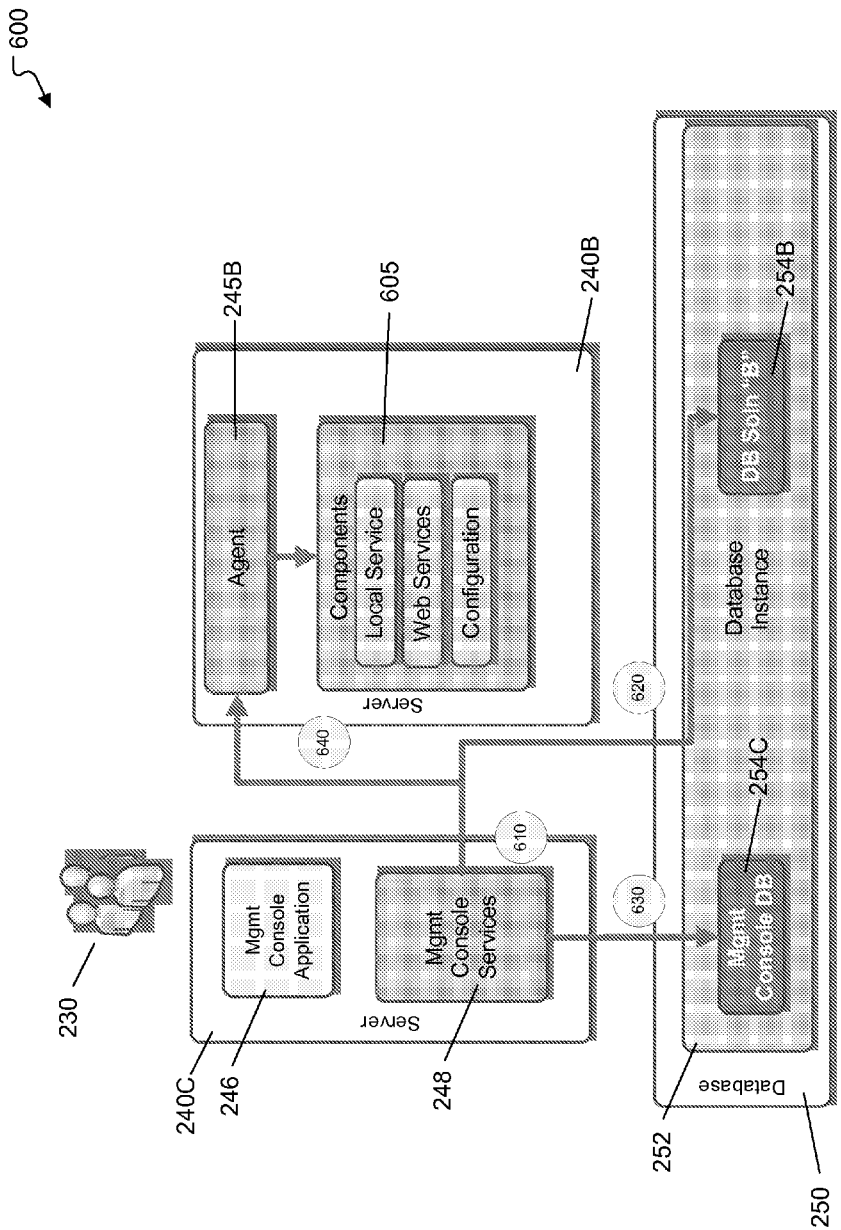
FIG. 6 illustrates an example workflow of an extensible deployment system in accordance with one or more implementations.

FIG. 6 illustrates an example workflow 600 of an extensible deployment system in accordance with one or more implementations. For explanatory purposes, the steps of example workflow 600 are described herein as occurring in serial, or linearly. However, multiple steps of example workflow 600 may occur in parallel. In addition, the steps of example workflow 600 need not be performed in the order shown and/or one or more of the blocks of example workflow 600 need not be performed.

The workflow 600 may include users 230, servers 240B and 240C, and a database server 250. The server 240B may include an agent 245B, and one or more components 605, such as local services, web services, and/or configuration information. The server 240C may include a management console application 246 and management console services 248. The database server 250 may include at least one database instance 252 that may include a management console database 254C and a database 254B.

At step 610, upon receiving a request to create a service grouping, a deployment management console of the management console services 248 may register the core environments for the service grouping. At step 620, the deployment management console of the management console services 248 creates the database components of the database 254B for the service grouping, such as by using scripts retrieved from the agent 245B.

At step 630, the deployment management console of the management console services 248 registers the database components of the database 254B in the registered database instance 252, such as through the management console database 254C. At step 640, the deployment management console of the management console services 248 creates the services on the server 240B with the components that are installed on the registered environment. For example, the deployment management console may transmit a command to the agent 245B that instructs the agent 245B to create the service 244C on the server 240B.

Figure 7:
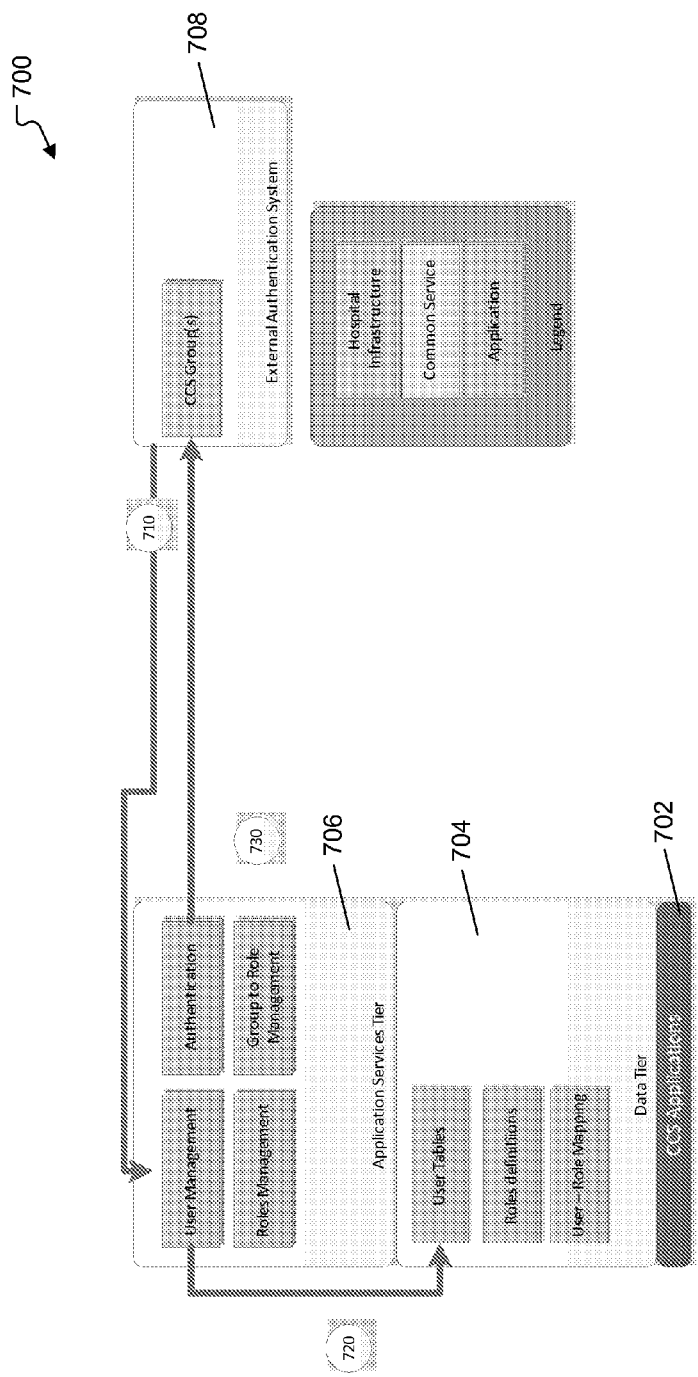
FIG. 7 illustrates an example workflow of user authentication in an extensible deployment system in accordance with one or more implementations.

FIG. 7 illustrates an example workflow 700 of user authentication in an extensible deployment system in accordance with one or more implementations. For explanatory purposes, the steps of example workflow 700 are described herein as occurring in serial, or linearly. However, multiple steps of example workflow 700 may occur in parallel. In addition, the steps of example workflow 700 need not be performed in the order shown and/or one or more of the blocks of example workflow 700 need not be performed.

The workflow 700 includes CCS applications 702, a data tier 704, an application services tier 706, and an external authentication system 708. The data tier 704 may include user tables, roles definitions, and user to role mappings. The application services tier 706 may include a user management service, a roles service, an authentication service, and a group to role management service. The services may be part of the management console services 248 and may be executing on the server 240C. The external authentication system 708 may include one or more groups of users associated with the CCS. In one or more embodiments, the external authentication system may be an Active Directory service of the hospital or IDN.

At step 710, the user authentication service retrieves user information from the external authentication system 708. For example, the user authentication service may retrieve user identifiers and other user identifying information from the external authentication system 708. In one or more implementations, the user authentication service may not retrieve passwords, or other security credential information from the external authentication system 708.

At step 720, the user management service may create profiles for the users retrieved from the external authentication system in the user tables and user-role mapping of the data tier 704. For example, the user management service may store the user profiles in the management console database 254C, or another database within the database instance 252. At step 730, the authentication service authenticates user credentials on demand through the external authentication system 708, as discussed above with respect to FIG. 5.

Figure 8:
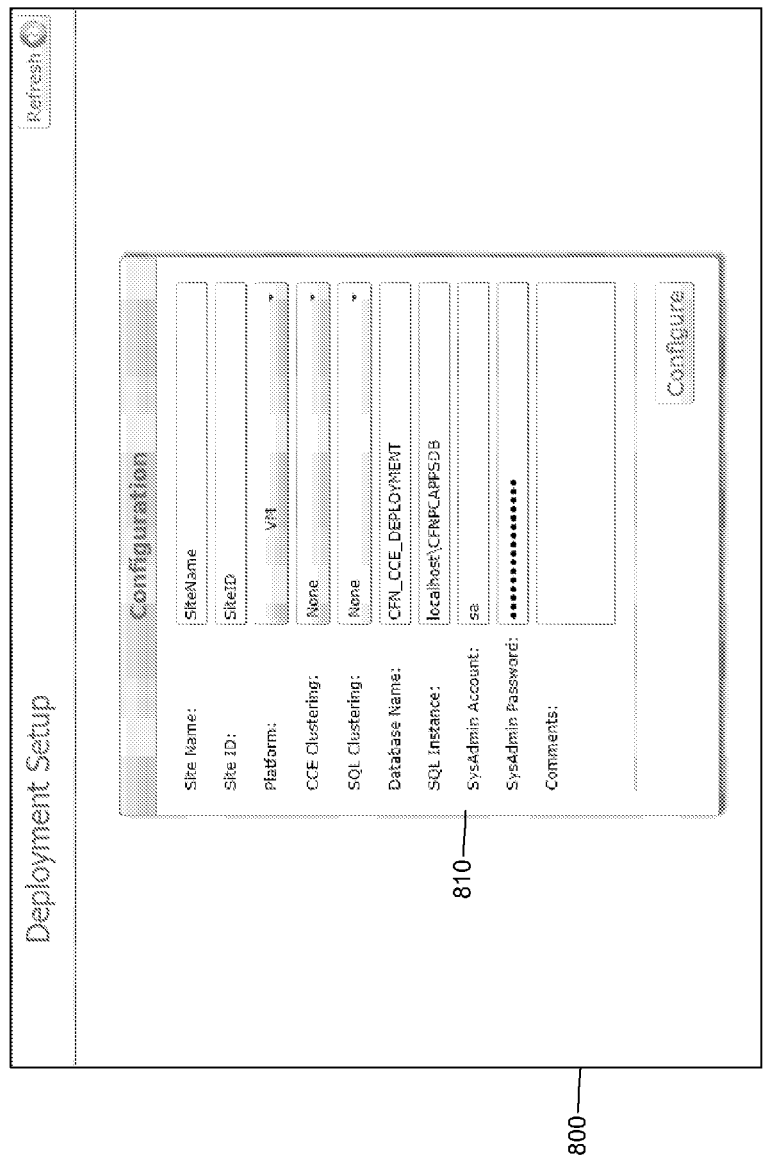
FIG. 8 illustrates an example user interface for providing configuration information in an extensible deployment system in accordance with one or more implementations.

FIG. 8 illustrates an example user interface 800 for providing configuration information in an extensible deployment system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 800 may include a deployment configuration window 810. The deployment configuration window 810 may include one or more input fields and/or input selectors that a user may use to provide information that may be used for an initial deployment of a CCS 120, such as an identifier of a database instance. In operation, the server 240C may provide the user interface 800 to a user through the management console application 246 when the user requests to create a new deployment. In one or more implementations, in response to the user providing the deployment information through the user interface 800, the server 240C may create the deployment database, such as the management console database 254C, and associate the deployment with a database instance 252.

Figure 9:
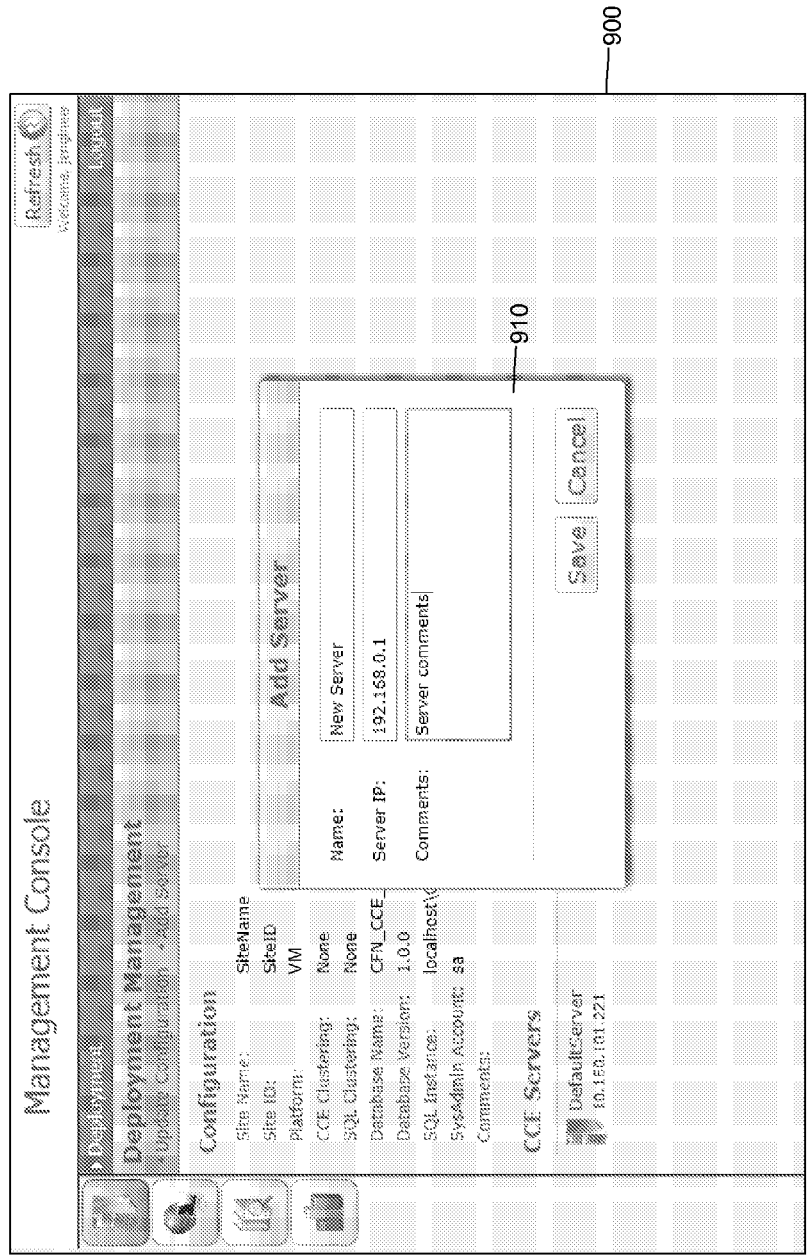
FIG. 9 illustrates an example user interface for adding a server in an extensible deployment system in accordance with one or more implementations.

FIG. 9 illustrates an example user interface 900 for adding a server in an extensible deployment system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 900 may include an add server window 910. The add server window 910 may include one or more input fields and/or input selectors for providing information related to a server being added to a deployment, such as the server 240A. For example, the add server window 910 may include a text field for providing a name, or an identifier, of the server 240A and a text field for providing a network address of the server 240A. In operation, the server 240C may provide the user interface 900 to a user through the management console application 246 when the user requests to add a server to a deployment. In one or more implementations, the user may be required to identify a server 240A through the user interface 900 before any service groupings, or solutions, can be created.

Figure 10:
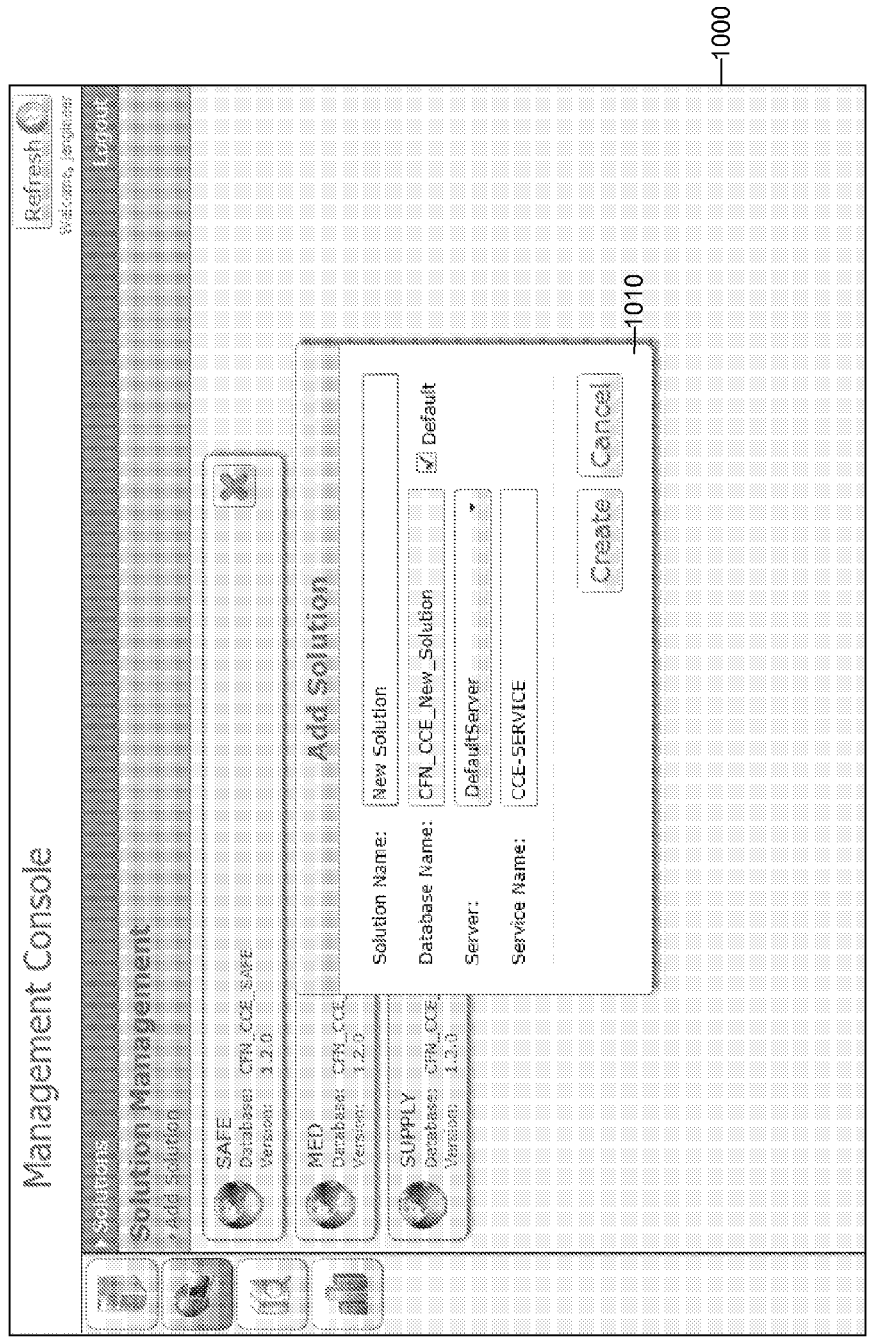
FIG. 10 illustrates an example user interface for adding a service grouping in an extensible deployment system in accordance with one or more implementations.

FIG. 10 illustrates an example user interface 1000 for adding a service grouping in an extensible deployment system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 1000 may include an add solution window 1010. The add solution window 1010 may include one or more input fields and/or input selectors for providing information related to a service grouping (or solution) being added to the deployment, such as a name of the service grouping, and an identifier of a server 240A that will be hosting at least one service of the service grouping. In operation, the server 240C may provide the user interface 1000 to a user through the management console application 246 when the user requests to add a new service grouping to a deployment. In one or more implementations, in response to the user providing the service grouping information through the user interface 1000, the server 240C may communicate with the agent 245A on the identified server 240A to retrieve the database scripts, and the server 240C may use the database scripts to create the database 254A in the database instance 252.

Figure 11:
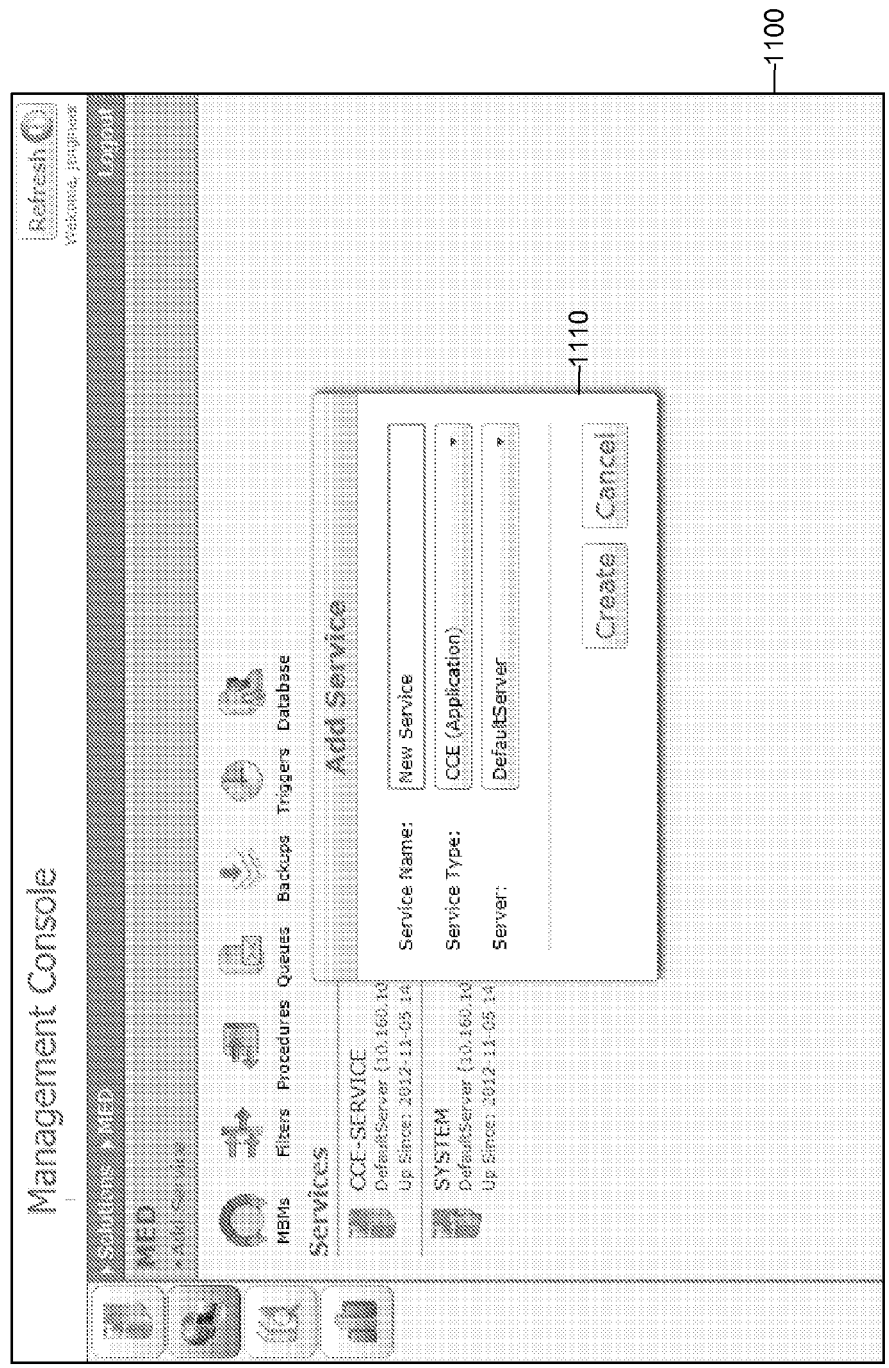
FIG. 11 illustrates an example user interface for adding a service to a service grouping in an extensible deployment system in accordance with one or more implementations.

FIG. 11 illustrates an example user interface 1100 for adding a service to a service grouping in an extensible deployment system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 1100 may include an add service window 1110. The add service window 1110 may include one or more input fields and/or input selectors for providing information related to a service 244A being added to a service grouping (or solution) of a deployment, such as a name of the service 244A, a type of the service 244A, and an identifier of the server 240A that will host the service 244A. In operation, the server 240C may provide the user interface 1100 to a user through the management console application 246 when the user requests to add a new service 244A to a service grouping. In one or more implementations, in response to the user providing the service information through the user interface 1100, the server 240C may communicate with the agent 245A on the identified server 240A to create the service 244A.

Figure 12:
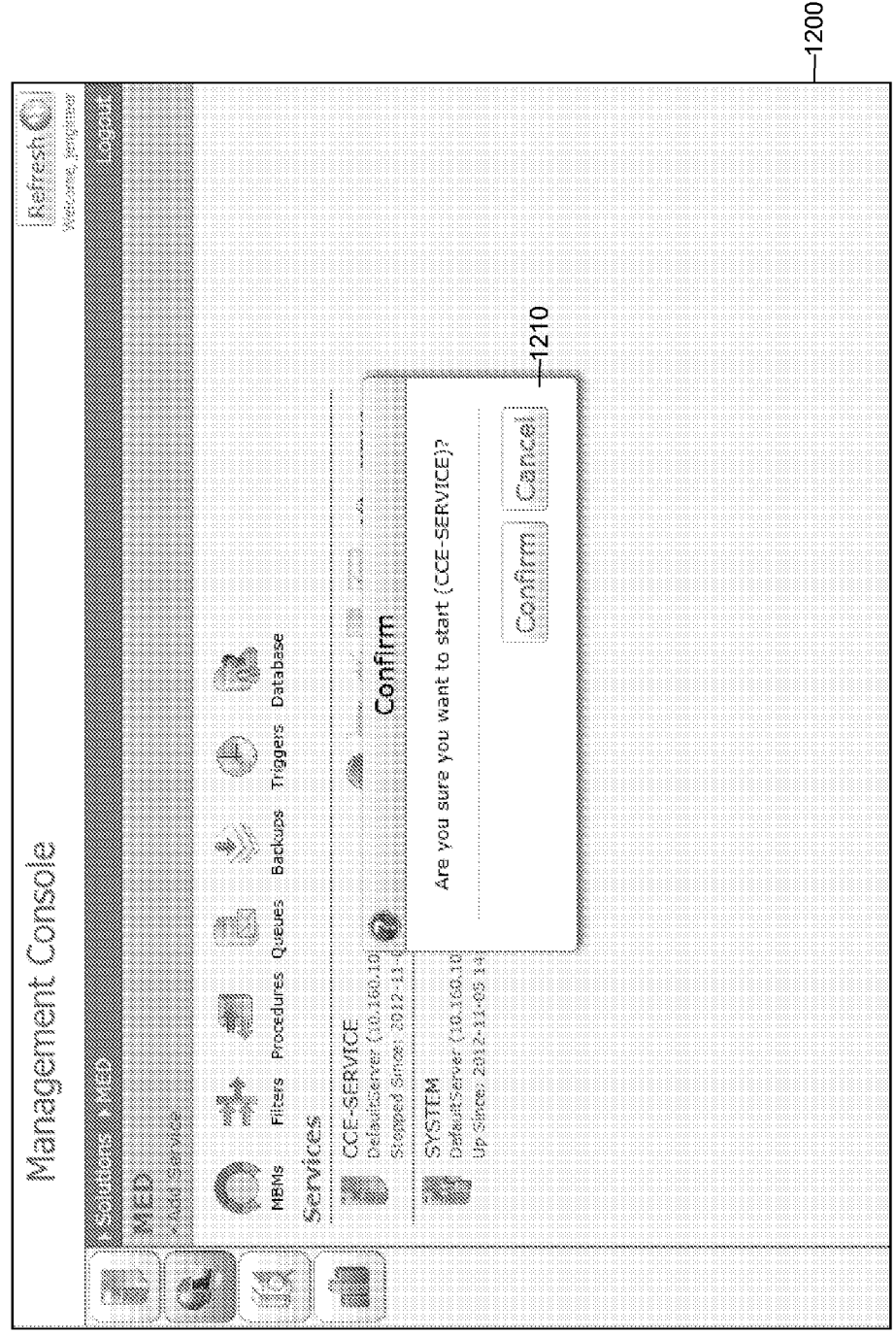
FIG. 12 illustrates an example user interface for initiating a service in an extensible deployment system in accordance with one or more implementations.

FIG. 12 illustrates an example user interface 1200 for initiating a service in an extensible deployment system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 1200 may include a confirmation window 1210. The confirmation window 1210 may include one or more input selectors that may be used by a user to confirm that a selected service 244A should be started. In operation, the server 240C may provide the user interface 1200 to a user through the management console application 246 when the user requests to initiate an existing service 244A, or after a new service 244A is added to a service grouping. In one or more implementations, in response to the user confirming that the service 244A should be started, the server 240C may communicate with the agent 245A on the identified server 240A to start, or initiate, the service 244A. The service 244A may communicate with the deployment database, such as the management console database 254C, at startup to determine which of the databases 254A-B should be used by the service.

Figure 13:
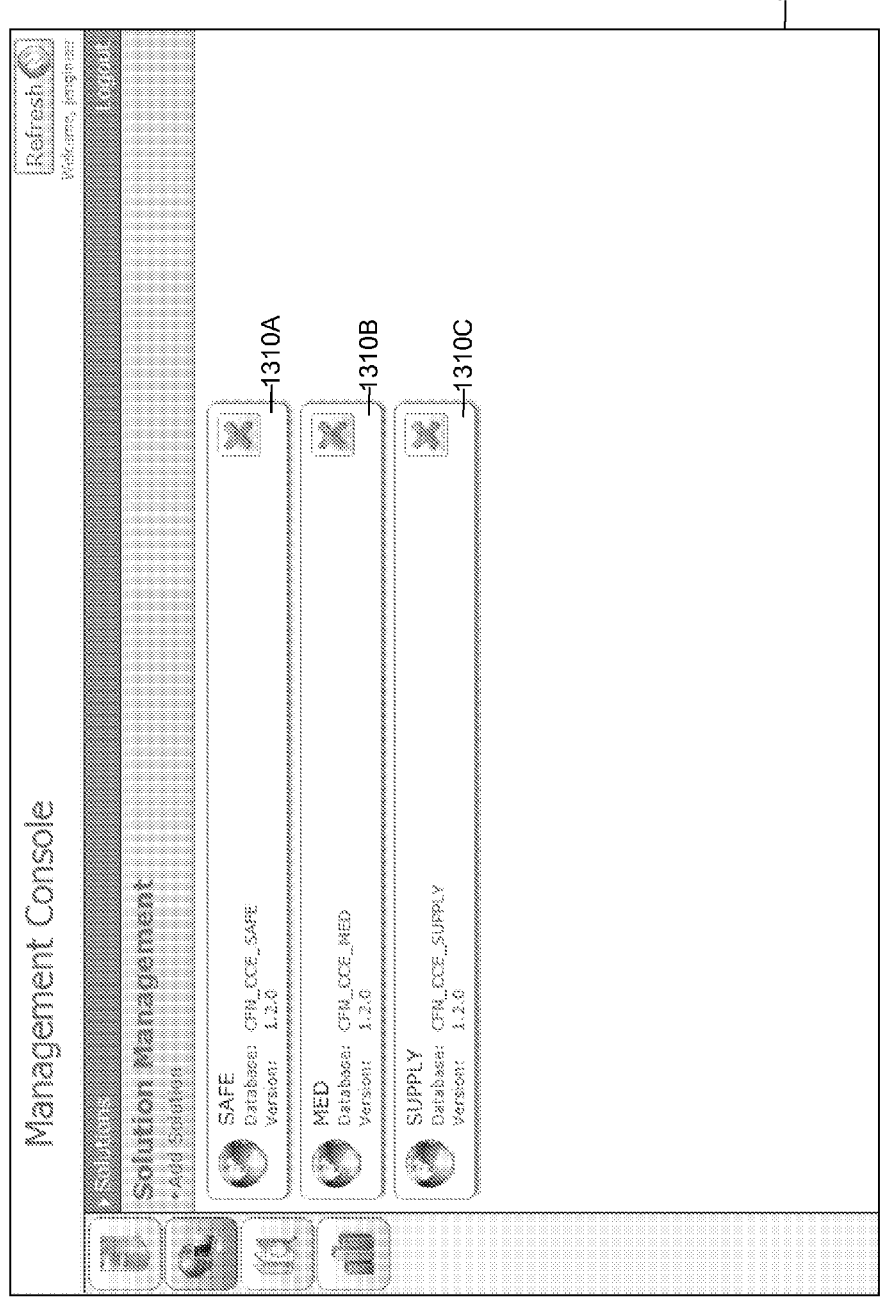
FIG. 13 illustrates an example user interface for managing service groupings in an extensible deployment system in accordance with one or more implementations.

FIG. 13 illustrates an example user interface 1300 for managing service groupings in an extensible deployment system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 1300 may allow a user to select a service grouping to manage after the service groupings have been deployed and configured. The user interface 1300 may include service grouping selectors 1310A-C. The service grouping selectors 1310A-C may each identify a different service grouping (or solution). A user may select any of the identified service groupings by clicking on the service grouping selectors 1310A-C. In one or more implementations, the service grouping selectors 1310A-C may also include a selector for deleting, or removing, the identified service groupings. In operation, the server 240C may provide the user interface 1300 to a user through the management console application 246 when the user first logs onto the management console application 246, or after a user creates a service grouping. In one or more implementations, in response to the user selecting one of the service grouping selectors 1310A-C, the server 240C may provide the user with the user interface 1400 that lists the services configured for the selected service grouping.

Figure 14:
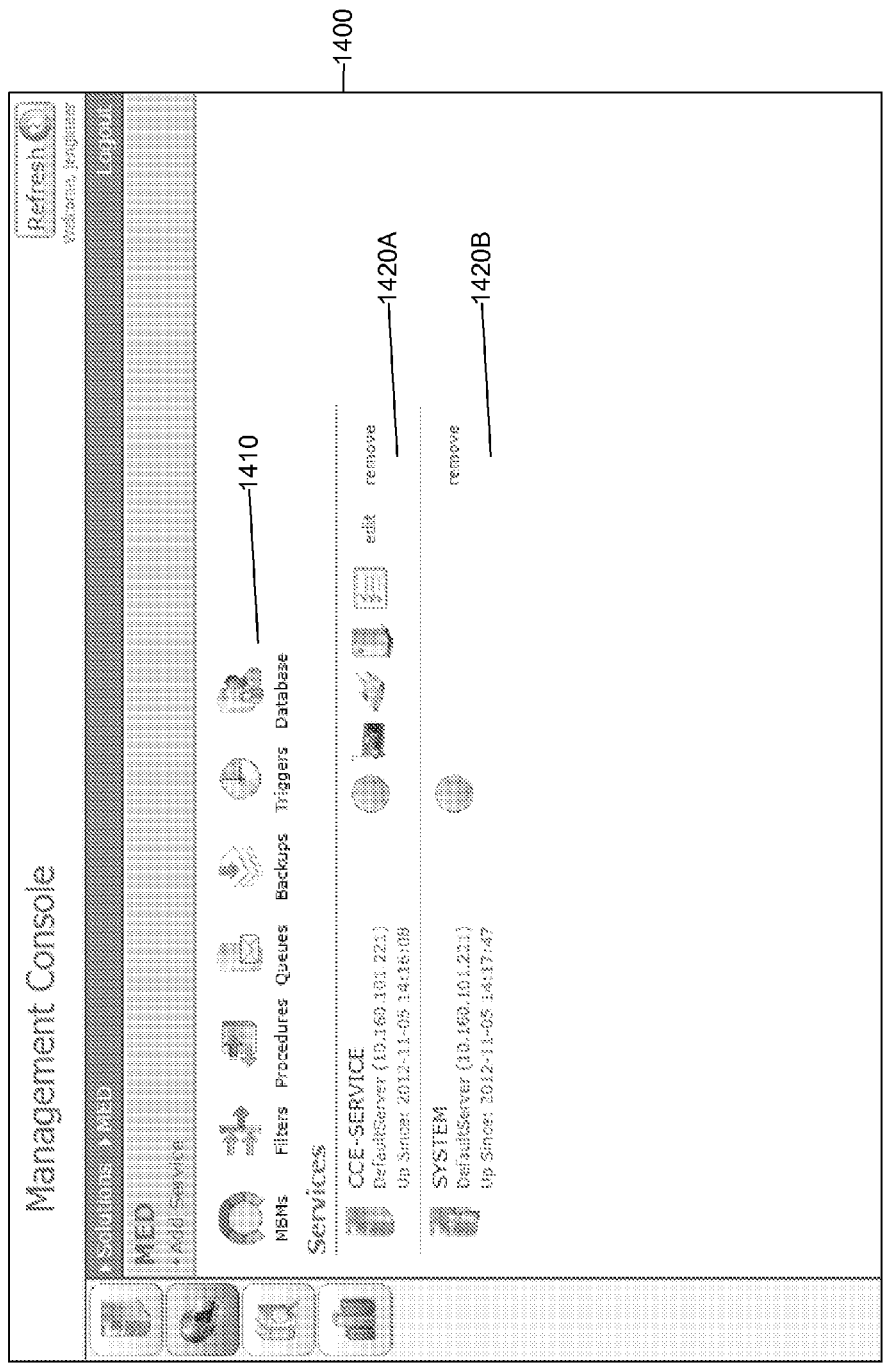
FIG. 14 illustrates an example user interface for managing services of a service grouping in an extensible deployment system in accordance with one or more implementations.

FIG. 14 illustrates an example user interface 1400 for managing services of a service grouping in an extensible deployment system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 1400 may include one or more configuration selectors 1410 and one or more service selectors 1420A-B. A user may select one of the configuration selectors 1410 to configure one or more aspects of a selected service grouping, such as filters, procedures, queues, etc. In one or more embodiments, the service selectors 1420A-B may include one or more graphical selectors that may be selected to perform various operations with respect to a selected service, such as editing a selected service, removing a selected service, etc. The user interface 1400 may also allow a user to stop/start services, add new services, or view any of the configuration interfaces for the selected service grouping. In operation, the server 240C may provide the user interface 1400 to a user through the management console application 246 when the user selects a service grouping, such as through the user interface 1300.

Figure 15:
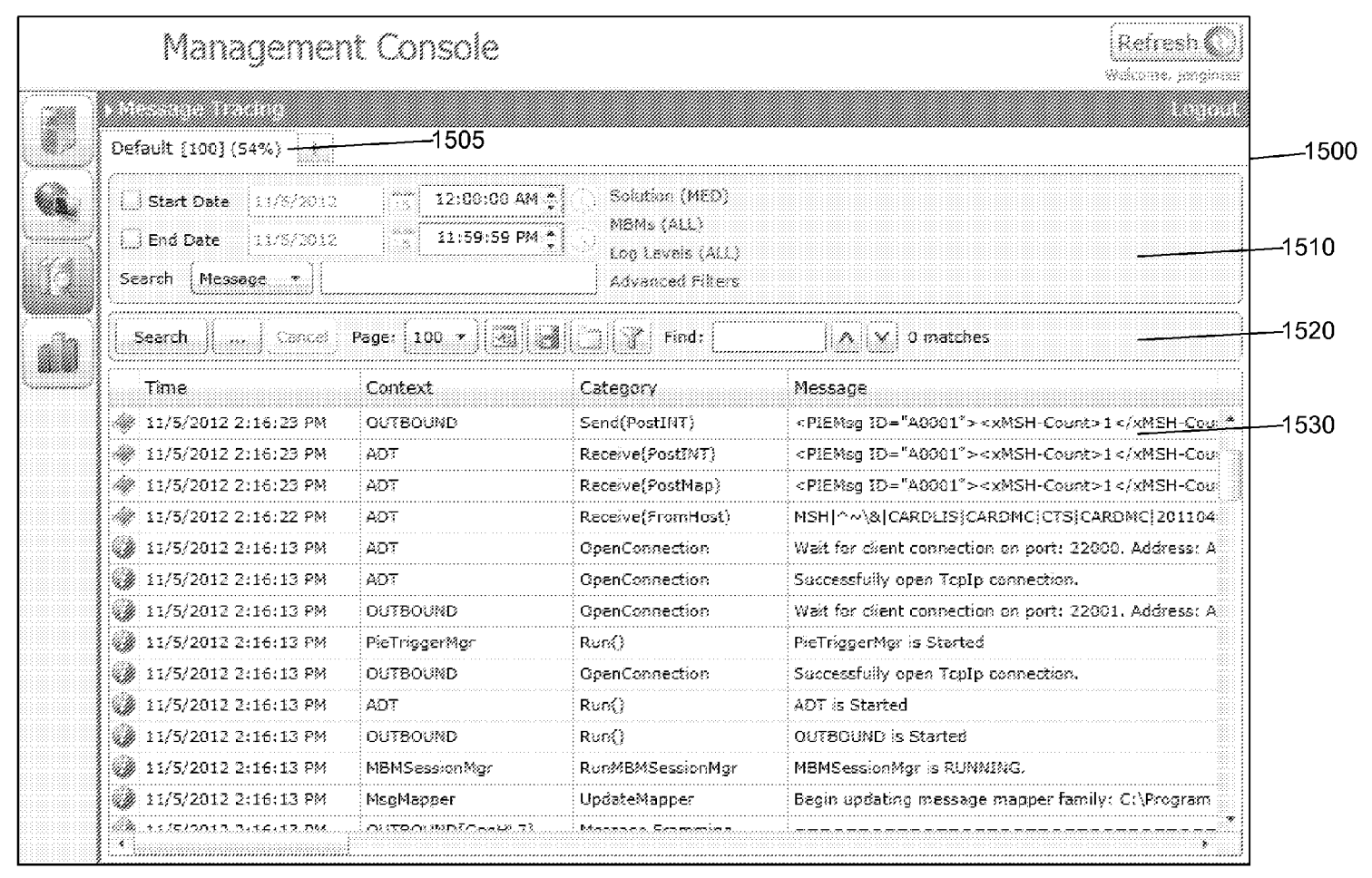

FIG. 15 illustrates an example user interface for message tracing in a deployed centralized communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 1500 may include a tab selector 1505, a filter section 1510, a refine section 1520, and a display window 1530. In operation, a user may trace messages transmitted by the services 244A-C using the user interface 1500. For example, the user may input filter criteria in the filter section 1510 to filter messages, and the user may refine the filer criteria in the refine section 1520. The user may view the messages that match the filtering and/or searching in the display window 1530. The user may select any of the messages in the display window 1530 to view the entire message content, such as by double clicking on a message. The user may use the tab selector 1505 to create a new tab in which a second message tracing operation may be performed independent of the message tracing operation of the display window 1530.

Figure 16:
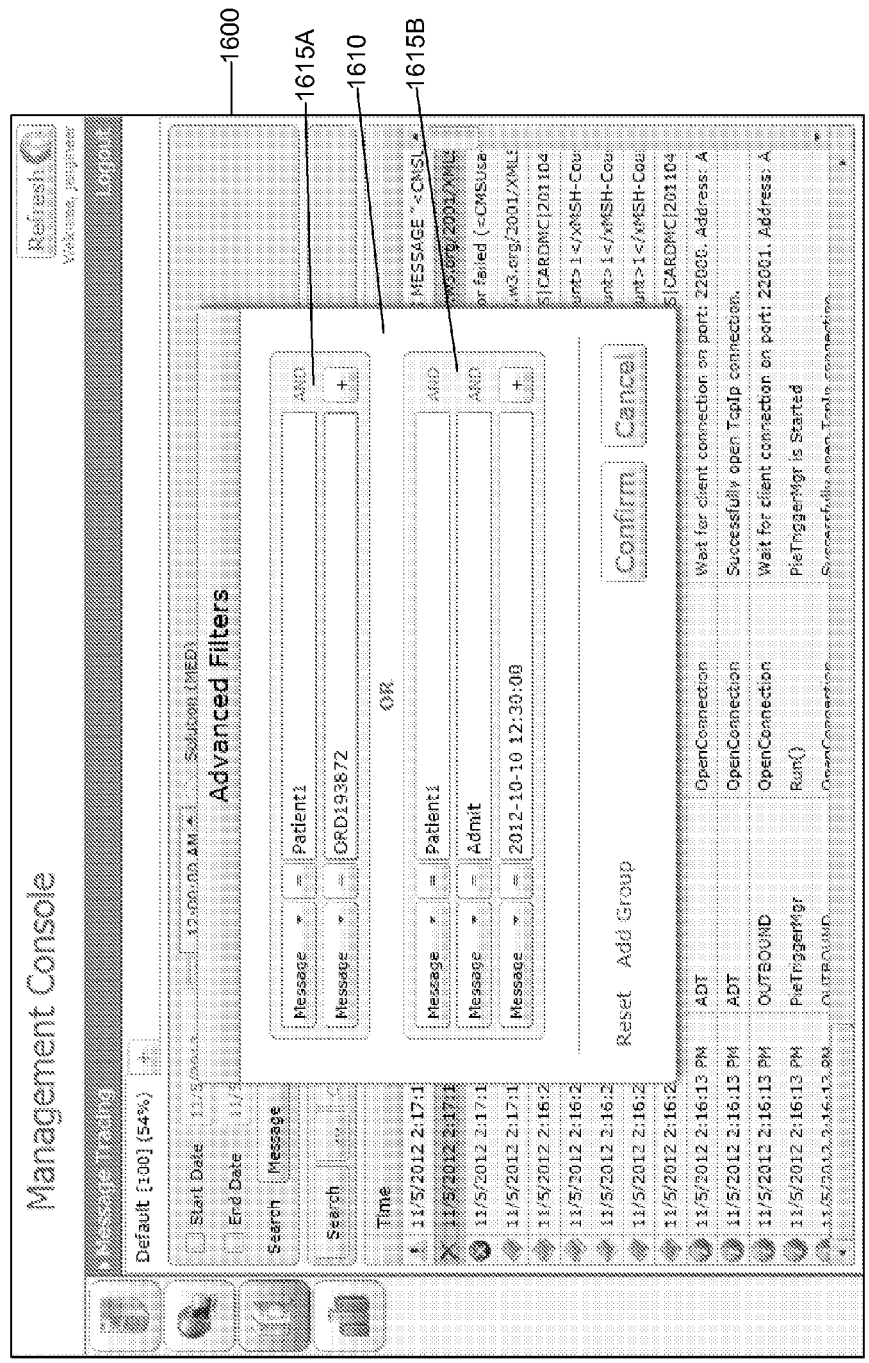
FIG. 16 illustrates an example user interface for filtering message tracing in a deployed centralized communication system in accordance with one or more implementations.

FIG. 16 illustrates an example user interface 1600 for filtering message tracing in a deployed centralized communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 1600 may include an advanced filter window 1610. The advanced filter window 1610 may include advanced filter criteria 1615A-B. A user may use the advanced filter window 1610 to perform advanced filtering for message tracing, such as by logically combining multiple filter criteria through the use of Boolean operators.

Figure 17:
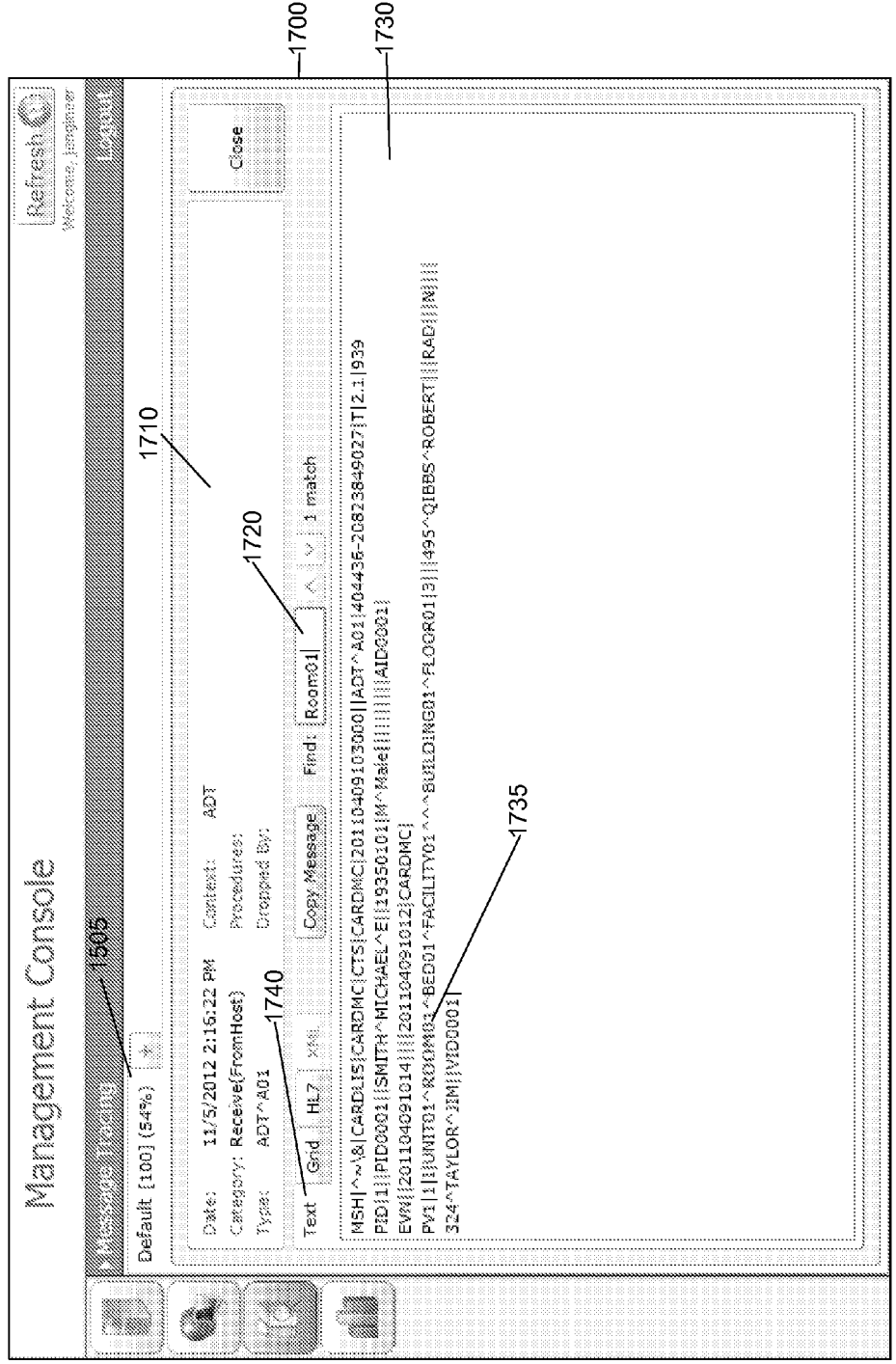
FIG. 17 illustrates an example user interface for searching message tracing in a text format in a deployed centralized communication system in accordance with one or more implementations.

FIG. 17 illustrates an example user interface 1700 for searching message tracing in a text format in a deployed centralized communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 1700 includes a tab selector 1505, a filter information section 1710, one or more output format tab selector 1740, a search field 1720, a display window 1730, and a matched search result 1735. The display window 1730 may display the content of a selected message in textual form, such as a message selected by a user in the user interface 1500. A user may use the search field 1720 of the user interface 1700 to search for a particular term or terms within the content of the message displayed in the display window 1730. For example, the user may input a search term in the search field 1720 and any matched search results 1735 within the content of the message may be highlighted in the display window 1730. The user may view the search results in a different form or format by selecting one of the output format tab selectors 1740.

Figure 18:
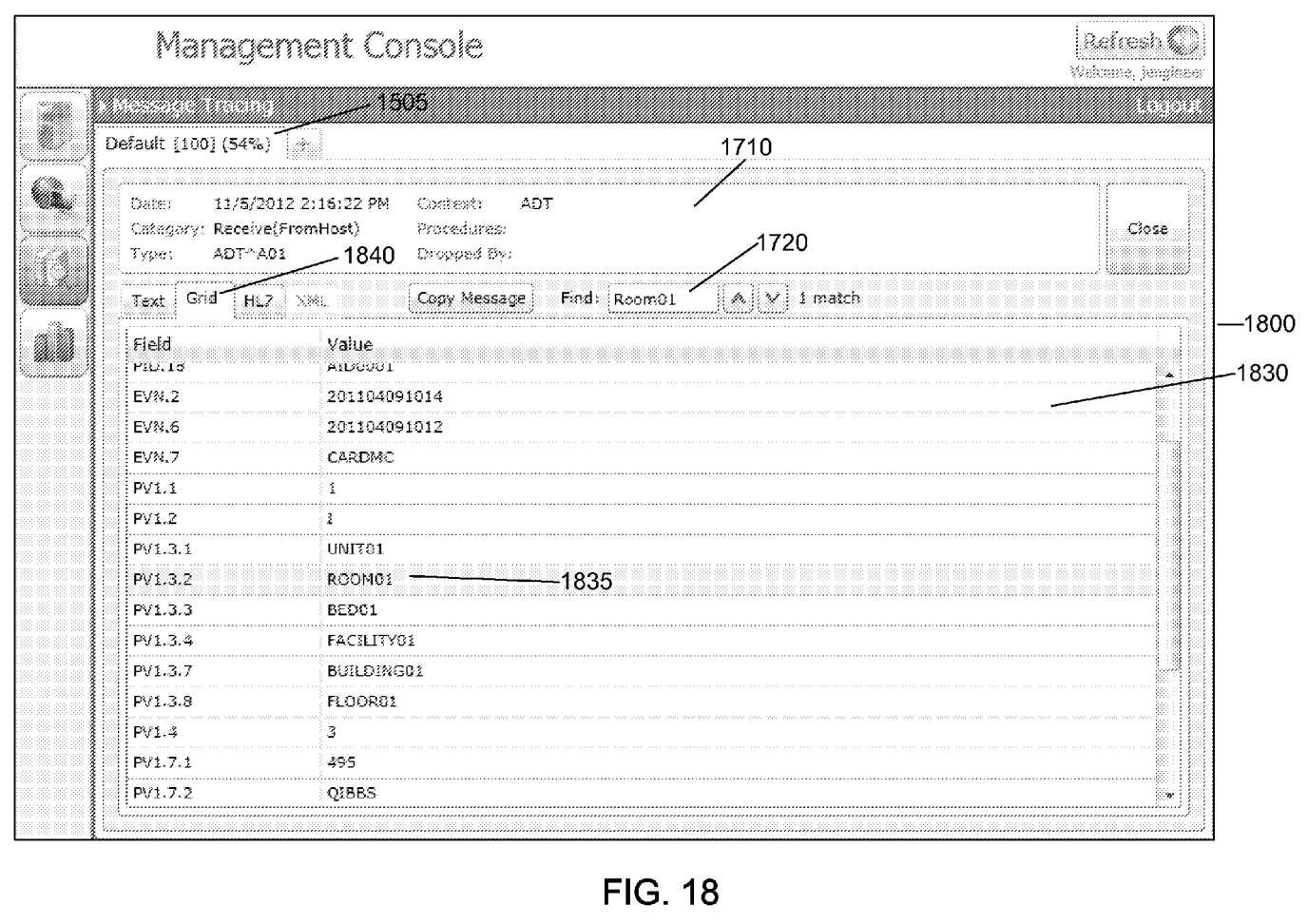

FIG. 18 illustrates an example user interface 1800 for searching message tracing in a grid format in a deployed centralized communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 1800 includes a tab selector 1505, a filter information section 1710, a output format tab selector 1840, a search field 1720, a display window 1830, and a matched row 1835. The display window 1830 may display the content of a selected message in a data grid, such as a message selected by a user in the user interface 1500. A user may use the search field 1720 of the user interface 1800 to search for a particular term or terms within the content of the message displayed in the display window 1830. For example, the user may input a search term in the search field 1720 and any matched rows 1835 within the content of the message may be highlighted in the display window 1830. In operation, the user may be provided with the user interface 1800 when the user selects the "Grid" output format tab selector 1740 from the user interface 1700.

Figure 19:
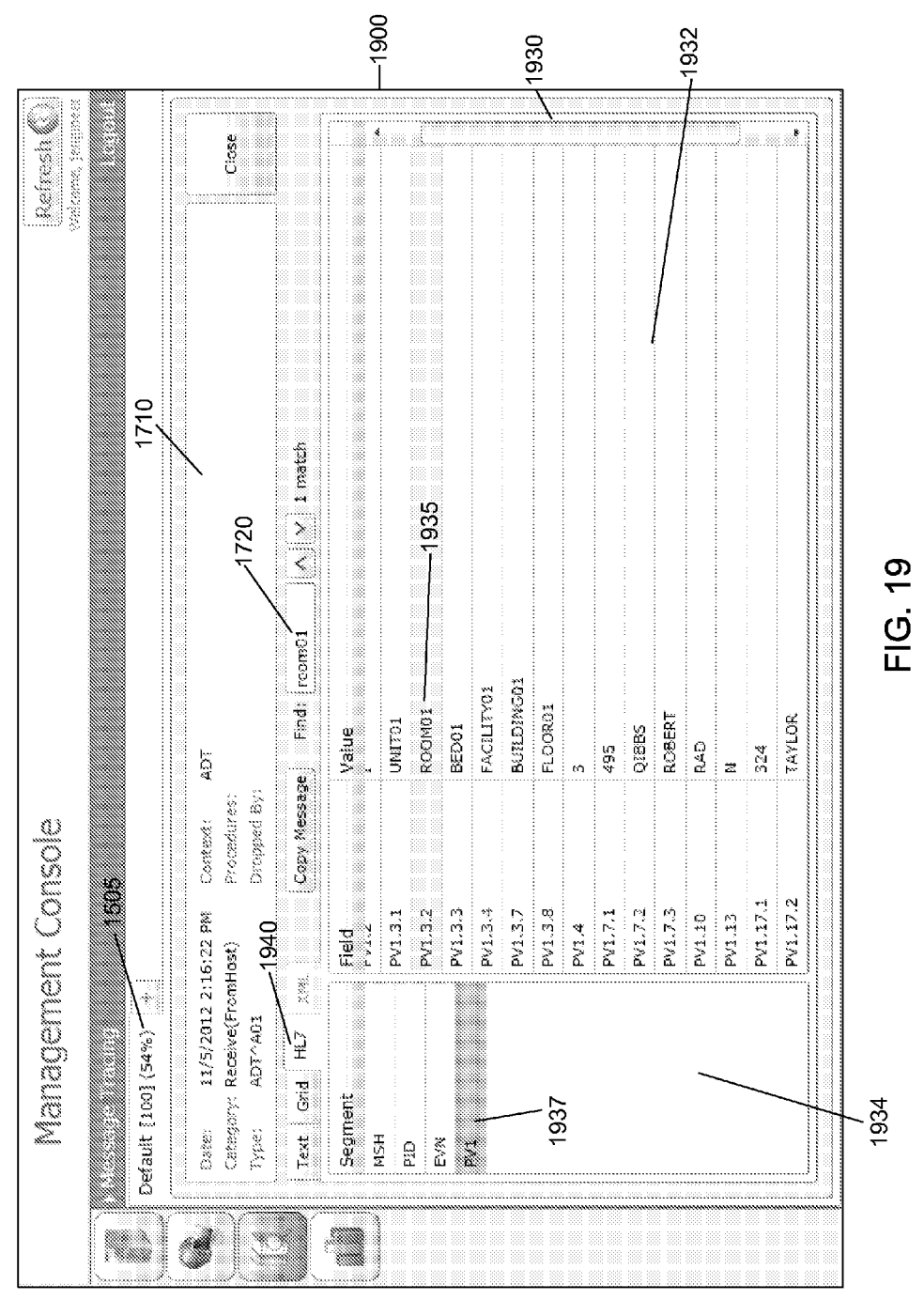

FIG. 19 illustrates an example user interface 1900 for searching message tracing in a health level 7 (HL7) format in a deployed centralized communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 1900 includes a tab selector 1505, a filter information section 1710, a output format tab selector 1940, a search field 1720, and a display window 1930. The display window 1930 may include a field window 1932 that includes a matched field 1935, and a segment window 1934 that includes a matched segment 1937. The display window 1930 may display the HL7 fields of a selected message grouped by segment, such as a message selected by a user in the user interface 1500. A user may use the search field 1720 of the user interface 1900 to search for a particular term or terms within the field window 1932 and the segment window 1934. For example, the user may input a search term in the search field 1720 and any matched fields 1935 and/or matched segments 1937 may be highlighted in the display window 1930. In operation, the user may be provided with the user interface 1900 when the user selects the "HL7" output format tab selector 1740 from the user interface 1700.

Figure 20:
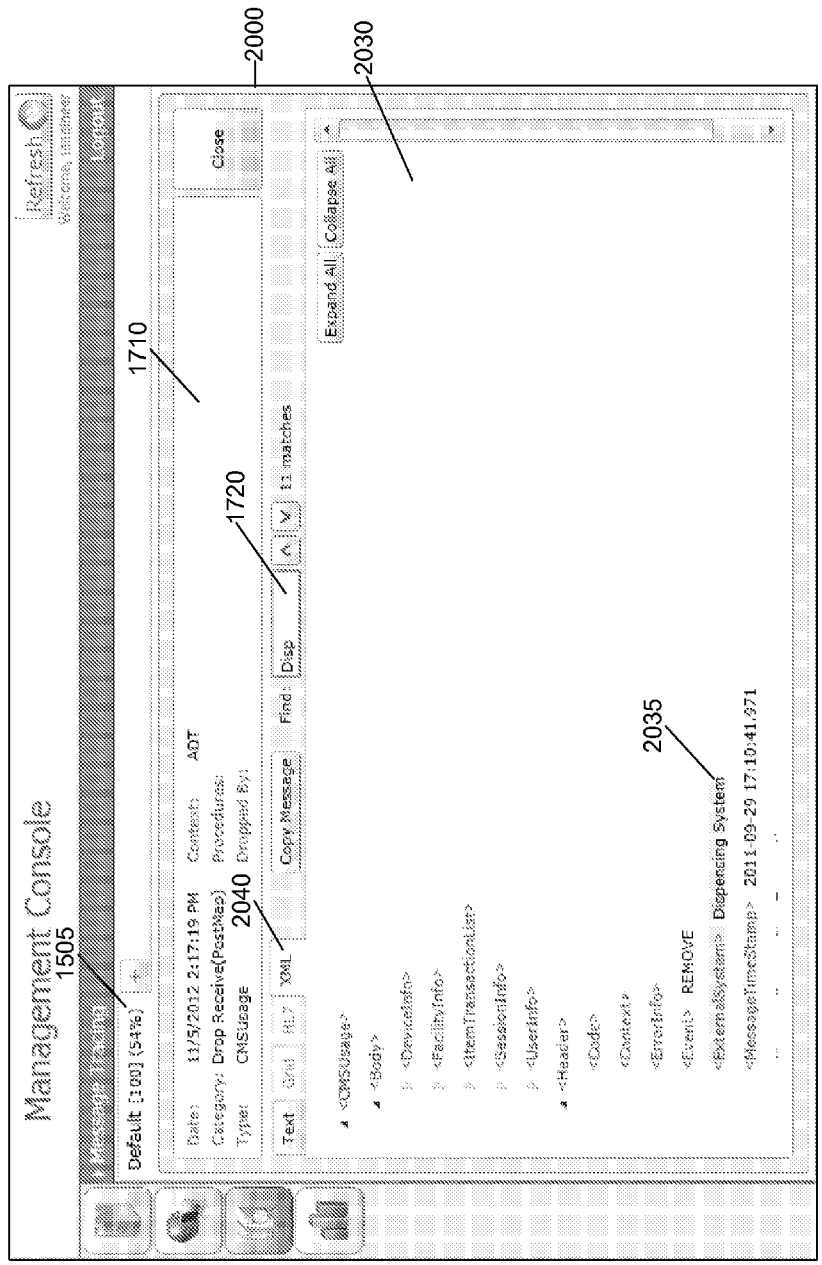
FIG. 20 illustrates an example user interface for searching message tracing in an extensible markup language (XML) format in a deployed centralized communication system in accordance with one or more implementations.

FIG. 20 illustrates an example user interface 2000 for searching message tracing in an extensible markup language (XML) format in a deployed centralized communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 2000 includes a tab selector 1505, a filter information section 1710, a output format tab selector 2040, a search field 1720, a display window 2030, and a matched element 2035. The display window 2030 may display the XML elements and values of a selected message in a tree view, such as a message selected by a user in the user interface 1500. A user may use the search field 1720 of the user interface 2000 to search for a particular term or terms within the elements or values of the message displayed in the display window 2030. For example, the user may input a search term in the search field 1720 and any matched elements 2035, and the corresponding values, may be highlighted in the display window 2030. In operation, the user may be provided with the user interface 2000 when the user selects the "XML" output format tab selector 2040.

Figure 21:
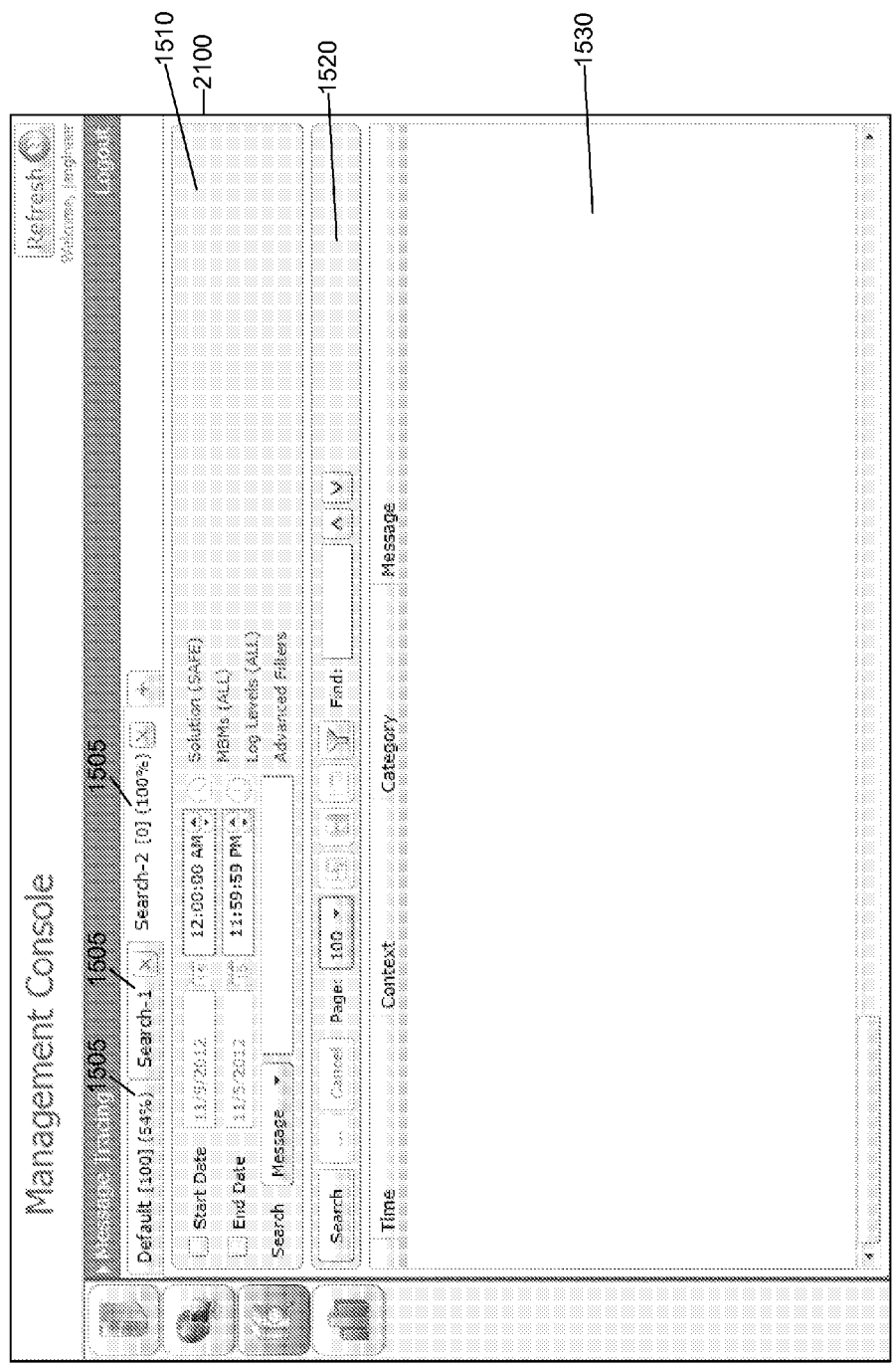
FIG. 21 illustrates an example user interface for multi-tab message tracing in a deployed centralized communication system in accordance with one or more implementations.

FIG. 21 illustrates an example user interface 2100 for multi-tab message tracing in a deployed centralized communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 2100 may include multiple tab selectors 1505, a filter section 1510, a refine section 1520, and a display window 1530. In operation, a user may trace messages transmitted by the services 242A-D using the user interface 2100. The user may use the tab selectors 1505 to view different search tabs that each may have their own search criteria. The tabs may be actively loading search results concurrently.

Figure 22:
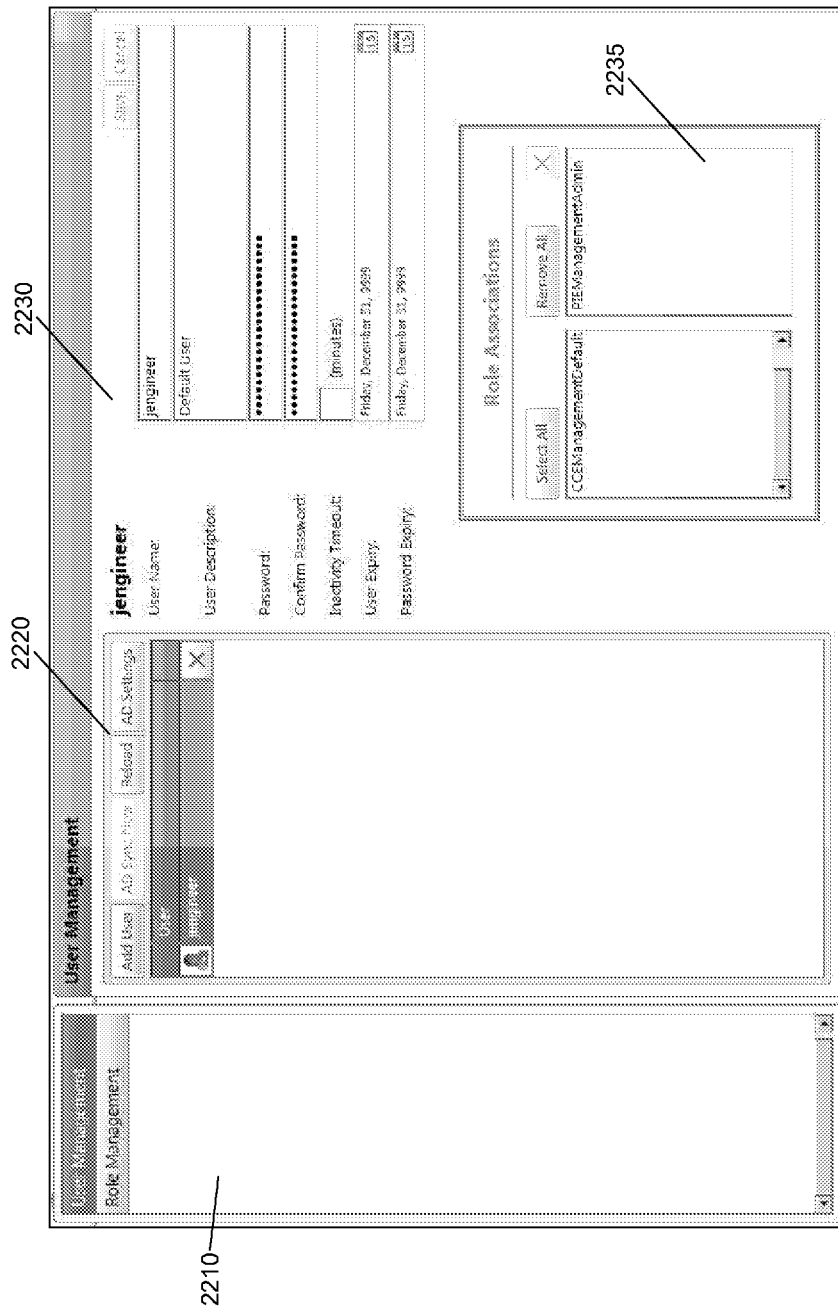
FIG. 22 illustrates an example user interface for user management in a extensible deployment system in accordance with one or more implementations.

FIG. 22 illustrates an example user interface 2200 for user management in a extensible deployment system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional, different or fewer components may be provided.

The user interface 2200 includes a user-role management section 2210, a user selection section 2220, and a user information section 2230, and a role associations section 2235. A user, such as an administrative user, may select whether to manage users or roles in the user-role management section 2210. The administrative user may select a user to modify, or to add a new user, in the user selection section 2220. The administrative user may modify a selected user's profile, or a new user's profile in the user information section 2230, and the administrative user may modify role associations in the role associations section 2235.

Figure 23:
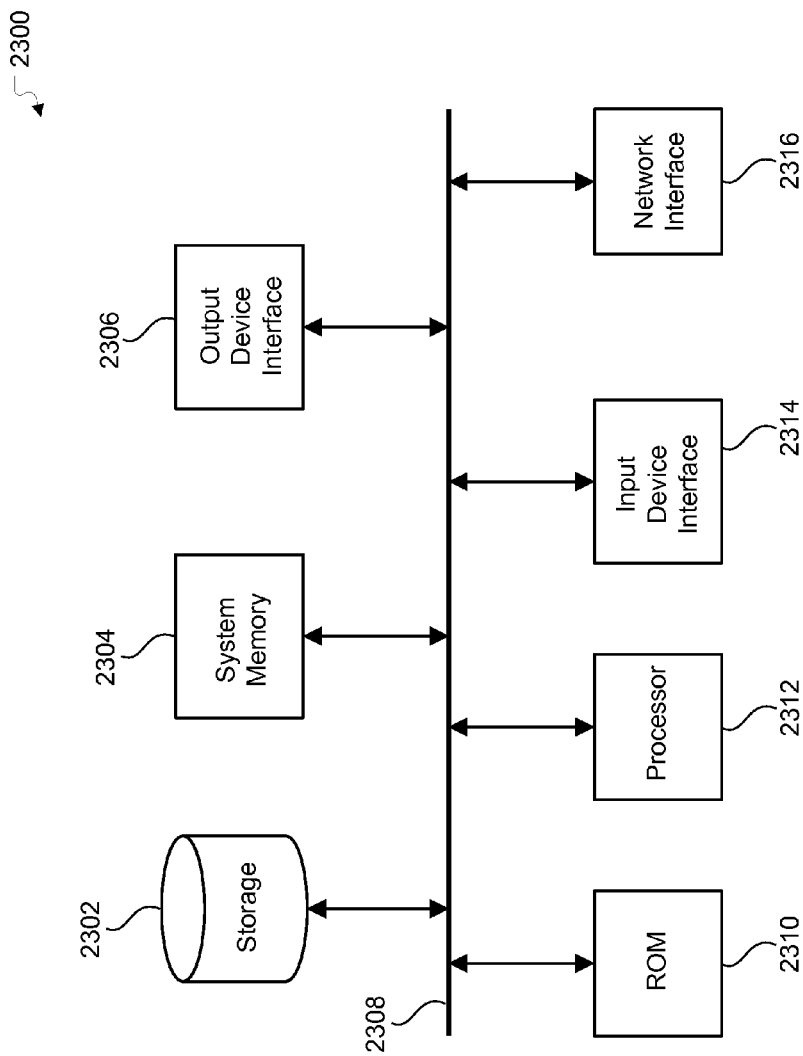
FIG. 23 conceptually illustrates an electronic system with which one or more implementations of the subject technology may be implemented.

FIG. 23 conceptually illustrates electronic system 2300 with which implementations of the subject technology can be implemented. Electronic system 2300, for example, can be, or can include, any of the medical devices 210, the data systems 220, the database server 250, or the servers 240A-C, a desktop computer, a laptop computer, a tablet computer, a server, a switch, a router, a base station, a receiver, a phone, a personal digital assistant (PDA), or generally any electronic device. Such an electronic system includes various types of computer readable media and interfaces for various other types of computer readable media. Electronic system 2300 includes bus 2308, processing unit(s) 2312, system memory 2304, read-only memory (ROM) 2310, permanent storage device 2302, input device interface 2314, output device interface 2306, and network interface 2316, or subsets and variations thereof.

Bus 2308 collectively represents system, peripheral, and chipset buses that communicatively connect the numerous internal devices of electronic system 2300. In one or more implementations, bus 2308 communicatively connects processing unit(s) 2312 with ROM 2310, system memory 2304, and permanent storage device 2302. From these various memory units, processing unit(s) 2312 retrieves instructions to execute and data to process in order to execute the processes of the subject disclosure. The processing unit(s) can be a single processor or a multi-core processor in different implementations.

ROM 2310 stores static data and instructions that are needed by processing unit(s) 2312 and other modules of the electronic system. Permanent storage device 2302, on the other hand, is a read-and-write memory device. This device is a non-volatile memory unit that stores instructions and data even when electronic system 2300 is off. One or more implementations of the subject disclosure use a mass-storage device (such as a magnetic or optical disk and its corresponding disk drive) as permanent storage device 2302.

Other implementations use a removable storage device (such as a floppy disk, flash drive, and its corresponding disk drive) as permanent storage device 2302. Like permanent storage device 2302, system memory 2304 is a read-and-write memory device. However, unlike storage device 2302, system memory 2304 is a volatile read-and-write memory, such as random access memory. System memory 2304 stores any of the instructions and data that processing unit(s) 2312 needs at runtime. In one or more implementations, the processes of the subject disclosure are stored in system memory 2304, permanent storage device 2302, and/or ROM 2310.

From these various memory units, processing unit(s) 2312 retrieves instructions to execute and data to process in order to execute the processes of one or more implementations.

Bus 2308 also connects to input and output device interfaces 2314 and 2306. Input device interface 2314 enables a user to communicate information and select commands to the electronic system. Input devices used with input device interface 2314 include, for example, alphanumeric keyboards and pointing devices (also called "cursor control devices"), touchpads, trackpads, or generally any device capable of receiving user input. Output device interface 2306 enables, for example, the display of images generated by electronic system 2300. Output devices used with output device interface 2306 include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 23, bus 2308 also couples electronic system 2300 to a network (not shown) through network interface 2316. In this manner, the computer can be a part of a network of computers (such as a local area network ("LAN"), a wide area network ("WAN"), or an Intranet, or a network of networks, such as the Internet. Electronic system 2300 may retrieve and/or receive information, e.g. via the network interface 2316, from a cloud system, e.g. a cloud storage system. Any or all components of electronic system 2300 can be used in conjunction with the subject disclosure.

In one or more implementations, the denominator and numerator of any ratio may be swapped, e.g. the ratio of two areas may be determined by dividing the first area by the second area or the second area by the first area. However, if the denominator and numerator of a ratio are swapped, the value of a threshold that the ratio is compared to may also be swapped accordingly.

Many of the above-described features and applications may be implemented as software processes that are specified as a set of instructions recorded on a computer readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. In one or more implementations, the computer readable media does not include carrier waves and electronic signals passing wirelessly or over wired connections, or any other ephemeral signals. For example, the computer readable media may be entirely restricted to tangible, physical objects that store information in a form that is readable by a computer. In one or more implementations, the computer readable media is non-transitory computer readable media, computer readable storage media, or non-transitory computer readable storage media.

In one or more implementations, a computer program product (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any clauses of this application, the terms "touch interface", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Terms such as "top," "bottom," "front," "rear" and the like as used in this disclosure, if any, should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the clauses, such term is intended to be inclusive in a manner similar to the term "comprise" as "comprise" is interpreted when employed as a transitional word in a clause.

All structural and functional equivalents to the elements of the various aspects described throughout this disclosure that are known or later come to be known to those of ordinary skill in the art are expressly incorporated herein by reference and are intended to be encompassed by the clauses.

The previous description is provided to enable any person skilled in the art to practice the various aspects described herein. Various modifications to these aspects will be readily apparent to those skilled in the art, and the generic principles defined herein may be applied to other aspects. Thus, the clauses are not intended to be limited to the aspects shown herein, but are to be accorded the full scope consistent with the language clauses, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for extensible deployment of a scalable communication system, the method comprising:
   receiving a first request to create a first service grouping for services that will share a first database, wherein the first request comprises a first identifier of a first server;
   retrieving first scripts for creating the first database from a first agent executing on the first server;
   generating, by a processor, the first database based on the first scripts;
   receiving a second request to add a first service to the first service grouping, wherein the second request comprises the first identifier of the first server;
   transmitting, to the first agent executing on the first server, a first command to create the first service on the first server; and
   providing a first indication that the first service was added to the first service grouping.

2. The method of claim 1, further comprising:
   receiving a third request to create a second service grouping for services that will share a second database, wherein the third request comprises a second identifier of a second server;
   retrieving second scripts for creating the second database from a second agent executing on the second server;
   generating, by a processor, the second database based on the second scripts;
   receiving a fourth request to add a second service to the second service grouping, wherein the fourth request comprises the second identifier of the second server;
   transmitting, to the second agent executing on the second server, a second command to create the second service on the second server; and
   providing a second indication that the second service was added to the second service grouping.

3. The method of claim 2, wherein a first schema of the first database is different than a second schema of the second database.

4. The method of claim 3, further comprising:
   providing a user interface for managing the first service and the second service, wherein the first service translates a first plurality of messages transmitted by a first plurality of devices in a hospital system and the second service translates a second plurality of messages transmitted by a second plurality of devices in the hospital system.

5. The method of claim 4, wherein the first service translates the first plurality of messages into an internal messaging format and the second service facilitates translates the second plurality of messages into the internal messaging format.

6. The method of claim 5, wherein the user interface comprises a single interface for tracing the first plurality of messages and the second plurality of messages.

7. The method of claim 6, wherein the user interface for managing the first service and the second service accesses a management database.

8. The method of claim 7, wherein a single database instance comprises the first database, the second database, and the management database.

9. The method of claim 8, wherein the single database instance comprises a SQL instance.

10. The method of claim 3, further comprising:
receiving a fifth request to add a third service to the second service grouping, wherein the fifth request comprises the second identifier of the second server;
transmitting, to the second agent executing on the second server, a third command to create the third service on the second server; and
providing a third indication that the third service was added to the second service grouping.

11. The method of claim 2, wherein the first request further comprises a first service grouping name of the service grouping and a first name of the first database comprises at least a portion of the first service grouping name.

12. The method of claim 11, wherein a prefix of the first name of the first database comprises the first service grouping name.

13. The method of claim 11, further comprising storing the first name of the first database in a management database that is distinct from the first database and the second database.

14. The method of claim 13, further comprising transmitting, to the first agent executing on the first server, a second command to start the first service on the first server.

15. The method of claim 14, further comprising, retrieving, by the first service and in response to receiving the second command, the first name of the first database from the management database.

16. A non-transitory machine readable medium embodying instructions that, when executed by a machine, cause the machine to perform a method for extensible deployment of a scalable communication system, the method comprising:
generating a management database in a database instance for supporting a plurality of groups of services;
receiving a first set of scripts from a first server and a second set of scripts from a second server;
generating a first database in the database instance for a first group of services of the plurality of groups of services using the first set of scripts and a second database in the database instance for a second group of services of the plurality of groups of services using the second set of scripts, wherein the first database comprises a different schema than the second database;
transmitting a first command to a first agent process executing on the first server to initiate a first service of the first group of services, wherein the first service accesses the first database to translate a first plurality of messages that are received from a first plurality of devices;
transmitting a second command to a second agent process executing on the second server to initiate a second service of the second group of services, wherein the second service accesses the second database to translate a second plurality of messages that are received from a second plurality of devices; and
providing a user interface for managing the first service and the second service.

17. The non-transitory machine readable medium of claim 16, wherein the first service translates the first plurality of messages into an internal messaging format and the second service translates the second plurality of messages into the internal messaging format.

18. The non-transitory machine readable medium of claim 16, wherein the method further comprises:
transmitting a third command to the first agent process executing on the first server to initiate a third service of the first group of services, wherein the third service accesses the first database to translate a third plurality of messages that are received from a third plurality of devices; and
providing the user interface for managing the first service, the second service, and the third service.

19. The non-transitory machine readable medium of claim 16, wherein the user interface comprises a single interface for tracing the first plurality of messages and the second plurality of messages.

20. The non-transitory machine readable medium of claim 16, wherein the method further comprises:
receiving a first name of the first group of services, wherein a first database name of the first database comprises at least a portion of the first name of the first group of services.

21. The non-transitory machine readable medium of claim 20, wherein the first service accesses the management database to retrieve the first database name of the first database when the first service is initiated.

22. The non-transitory machine readable medium of claim 16, wherein the database instance comprises a SQL instance.

* * * * *